(12) United States Patent
Ito et al.

(10) Patent No.: US 8,799,962 B2
(45) Date of Patent: Aug. 5, 2014

(54) DISPLAY CONTROL SYSTEM, DISPLAY CONTROL DEVICE, AND DISPLAY CONTROL METHOD

(75) Inventors: Akihiko Ito, Kanagawa (JP); Kazuhiro Fukuda, Kanagawa (JP)

(73) Assignee: Sony Corporation (JP)

( * ) Notice: Subject to any disclaimer, the term of this patent is extended or adjusted under 35 U.S.C. 154(b) by 406 days.

(21) Appl. No.: 12/925,064

(22) Filed: Oct. 12, 2010

(65) Prior Publication Data

US 2011/0115699 A1    May 19, 2011

(30) Foreign Application Priority Data

Nov. 17, 2009   (JP) ................................ P2009-261698

(51) Int. Cl.
| | |
|---|---|
| G06F 3/00 | (2006.01) |
| G06F 13/00 | (2006.01) |
| H04N 5/445 | (2011.01) |

(52) U.S. Cl.
USPC ................................. 725/61; 725/44; 725/46

(58) Field of Classification Search
USPC .............................................. 725/61, 44, 46
See application file for complete search history.

(56) References Cited

U.S. PATENT DOCUMENTS

| | | | |
|---|---|---|---|
| 2006/0212900 A1* | 9/2006 | Ismail et al. ..................... | 725/34 |
| 2006/0248091 A1 | 11/2006 | Yamamoto et al. | |
| 2008/0209325 A1* | 8/2008 | Suito et al. ..................... | 715/719 |
| 2009/0080698 A1* | 3/2009 | Mihara et al. .................. | 382/103 |
| 2009/0282001 A1 | 11/2009 | Fukuda | |

FOREIGN PATENT DOCUMENTS

| | | |
|---|---|---|
| EP | 1608175 A2 | 12/2005 |
| EP | 2043047 A2 | 4/2009 |
| JP | 2002082973 A | 3/2002 |
| JP | 2005102109 A | 4/2005 |
| JP | 2006157899 A | 6/2006 |
| JP | 2006164246 A | 6/2006 |
| JP | 4162014 B2 | 8/2008 |
| JP | 2008197924 A | 8/2008 |
| JP | 2009060328 A | 3/2009 |
| JP | 2009118343 A | 5/2009 |
| WO | 2008117469 A1 | 10/2008 |

OTHER PUBLICATIONS

European Search Report EP 10187749, dated Feb. 14, 2011.
Office Action from Japanese Application No. 2009-261698, dated Oct. 1, 2013.

* cited by examiner

*Primary Examiner* — Hunter B Lonsberry
*Assistant Examiner* — Tung T Trinh
(74) *Attorney, Agent, or Firm* — Lerner, David, Littenberg, Krumholz & Mentlik, LLP

(57) ABSTRACT

Provided is a display control device including a display control unit that, when display information of one content among a plurality of contents is selected on a display screen, creates a next display screen containing display information of at least any of a plurality of contents relevant to the one content, wherein the display information contained in the next display screen is display information of contents according to a selection sequence of a plurality of display information having been selected before among the plurality of contents relevant to the one content.

10 Claims, 25 Drawing Sheets

FIG. 12

| LOG ID | MAIN CONTENT ID | ATTRIBUTE CLASSIFICATION WITH ATTRIBUTE VALUE COMMON TO IMMEDIATELY PREVIOUS MAIN CONTENT | ATTRIBUTE VALUE COMMON TO IMMEDIATELY PREVIOUS MAIN CONTENT | LOG ACQUISITION DATE AND TIME |
|---|---|---|---|---|
| 0001 | CONTENT A | - | - | 2009-11-01 10:10:10 |
| 0002 | CONTENT B | "CAST" | A | 2009-11-01 10:10:20 |
| 0003 | CONTENT C | "CAST" | A | 2009-11-01 10:10:30 |
| 0004 | CONTENT D | "LOCATION" "CAST" | KYOTO B | 2009-11-01 10:11:10 |
| 0005 | CONTENT E | "CLASSIFICATION" OF "CAST" | IDOL | 2009-11-01 10:11:20 |
| 0006 | CONTENT F | "LOCATION" | TOKYO TOWER | 2009-11-01 10:11:30 |
| 0007 | CONTENT G | "PERIOD" | MUROMACHI PERIOD | 2009-11-01 10:12:10 |
| ... | | | | |
| 0123 | CONTENT Y | "CAST" | C | 2009-11-03 16:23:50 |

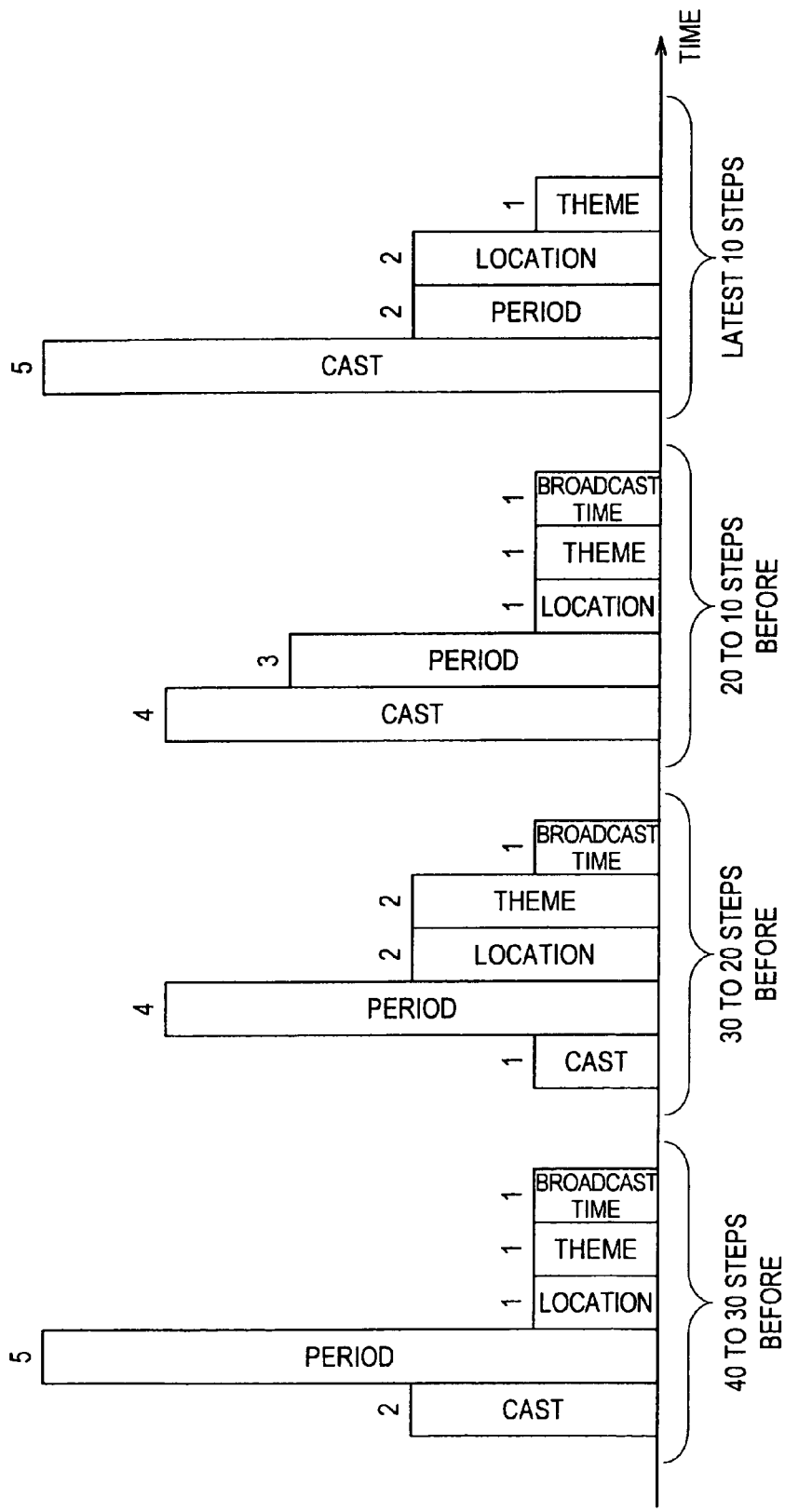

FIG. 14

| ATTRIBUTE CLASSIFICATION | SELECTION TENDENCY |
|---|---|
| CAST | 45% |
| PERIOD | 25% |
| LOCATION | 15% |
| THEME | 10% |
| BROADCAST TIME | 5% |

FIG. 15

| RELEVANT CONTENT TO MAIN CONTENT | ATTRIBUTE CLASSIFICATION WITH ATTRIBUTE VALUE COMMON TO MAIN CONTENT |
|---|---|
| CONTENT L | LOCATION(15) |
| CONTENT M | CAST(45) |
| CONTENT N | LOCATION(15), THEME(10), BROADCAST TIME(5) |
| CONTENT O | PERIOD(25) |
| CONTENT P | CAST(45), PERIOD(25) |
| CONTENT Q | LOCATION(15), BROADCAST TIME(5) |
| CONTENT R | BROADCAST TIME(5) |

FIG. 19

| RELEVANT CONTENT TO MAIN CONTENT | ATTRIBUTE CLASSIFICATION WITH ATTRIBUTE VALUE COMMON TO MAIN CONTENT | PRIORITY |
|---|---|---|
| CONTENT L | LOCATION(15) | 15 |
| CONTENT B | CAST(45) | 5 (IMMEDIATELY PREVIOUS MAIN CONTENT) |
| CONTENT N | LOCATION(15), THEME(10) | 25 |
| CONTENT O | PERIOD(25) | 25 |
| CONTENT P | CAST(45), PERIOD(25) | 70 |
| CONTENT Q | LOCATION(15), BROADCAST TIME(5) | 20 |
| CONTENT R | BROADCAST TIME(5) | 5 |

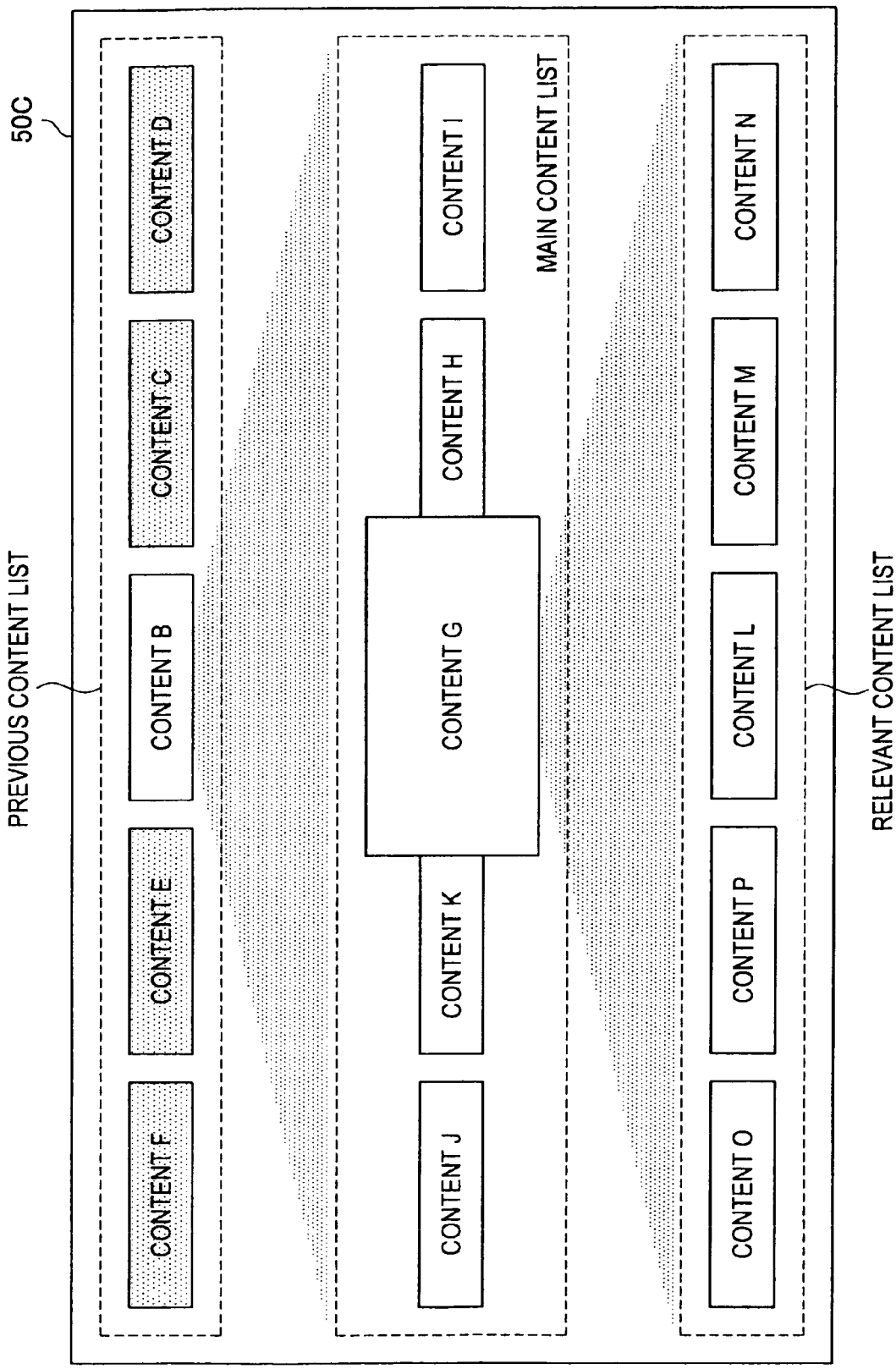

DISPLAY CONTROL SYSTEM, DISPLAY CONTROL DEVICE, AND DISPLAY CONTROL METHOD

CROSS-REFERENCE TO RELATED APPLICATION

The present application claims priority from Japanese Patent Application No. JP 2009-261698 filed in the Japanese Patent Office on Nov. 17, 2009, the entire content of which is incorporated herein by reference.

BACKGROUND OF THE INVENTION

1. Field of the Invention

The present invention relates to a display control system, a display control device, and a display control method.

2. Description of the Related Art

Digitization of digital broadcasting is increasingly prevalent today, and, accordingly, an ECG (Electronic Content Guide; or EPG) service that broadcasts information for a program search, superimposed on a broadcast wave, is widely used. The ECG contains display information such as a program thumbnail or title, so that a user can search for a desired program by checking the display information of each program on a display screen. The ECG related technique is disclosed in Japanese Patent No. 4162014, for example.

Further, systems for displaying the display information of programs relevant to a program which is viewed by a user on the display screen are proposed. Those systems can recommend relevant programs to a user automatically without a user operation such as entering a keyword, which is convenient for a user.

SUMMARY OF THE INVENTION

However, in most of the above systems, relevant programs of a certain program are extracted only on the basis of the program which has been viewed most recently by a user. Thus, there is a concern that programs (contents) which are recommended as relevant programs of one program are always the same.

In light of the foregoing, it is desirable to provide a novel and improved display control system, display control device, and display control method which can display the display information of relevant contents according to the selection sequence of previously selected contents.

According to an embodiment of the present invention, there is provided a display control system including a server device that stores content information and provides the content information, and a display control device including a display control unit that, based on content information of a plurality of contents provided from the server device, creates a display screen containing display information of at least any of the plurality of contents and, when display information of one content of the plurality of contents is selected, creates a next display screen containing display information of at least any of a plurality of contents relevant to the one content. The display information contained in the next display screen is display information of contents according to a selection sequence of a plurality of display information having been selected before among the plurality of contents relevant to the one content.

The display control device may further include an extraction unit that extracts an attribute classification of an attribute value common between two contents corresponding to two successive display information in the selection sequence, and display information of a content having an attribute value common to the attribute value of the attribute classification of the one content extracted by the extraction unit among the plurality of contents relevant to the one content may be preferentially incorporated into the next display screen.

The display control device may further include a priority setting unit that sets a priority to each of display information of the plurality of contents relevant to the one content based on whether each of the plurality of contents relevant to the one content has an attribute value common to the attribute value of the attribute classification of the one content extracted by the extraction unit, and the display control unit may create the next display screen according to the priority set by the priority setting unit.

The priority setting unit may set a higher priority to display information of a content with the attribute classification of the attribute value common to the one content having a higher extraction tendency by the extraction unit.

The display control device may further include a calculation unit that calculates an extraction tendency by the extraction unit for each attribute classification based on a number of attribute classifications extracted by the extraction unit.

The priority setting unit may reduce a priority of display information having been contained in the display screen before among the display information of the plurality of contents relevant to the one content.

The priority setting unit may reduce priorities of the plurality of display information having been selected before among the display information of the plurality of contents relevant to the one content.

According to another embodiment of the present invention, there is provided a display control device including a display control unit that, when display information of one content among a plurality of contents is selected on a display screen, creates a next display screen containing display information of at least any of a plurality of contents relevant to the one content. The display information contained in the next display screen is display information of contents according to a selection sequence of a plurality of display information having been selected before among the plurality of contents relevant to the one content.

According to another embodiment of the present invention, there is provided a display control method including the steps of creating a display screen containing at least any of a plurality of contents, and creating, when one content is selected on the display screen, a next display screen containing display information of at least any of a plurality of contents relevant to the one content. The display information contained in the next display screen is display information of contents according to a selection sequence of a plurality of display information having been selected before among the plurality of contents relevant to the one content.

According to the embodiments of the present invention described above, it is possible to display the display information of relevant contents according to the selection sequence of previously selected contents.

BRIEF DESCRIPTION OF THE DRAWINGS

FIG. 12 is an explanatory view showing a specific example of a selection sequence table stored in a table storage unit.

FIG. 13 is an explanatory view schematically showing the number of relevant contents selected in relation to each attribute classification.

FIG. 14 is an explanatory view showing an example of calculation of a selection tendency.

FIG. 15 is an explanatory view showing a specific example of attribute classifications common to a main content and a relevant content.

FIG. 19 is an explanatory view showing a specific example of priority setting.

FIG. 26 is an explanatory view showing a content list screen according to a third alternative example.

DETAILED DESCRIPTION OF THE EMBODIMENT(S)

Figure 1:
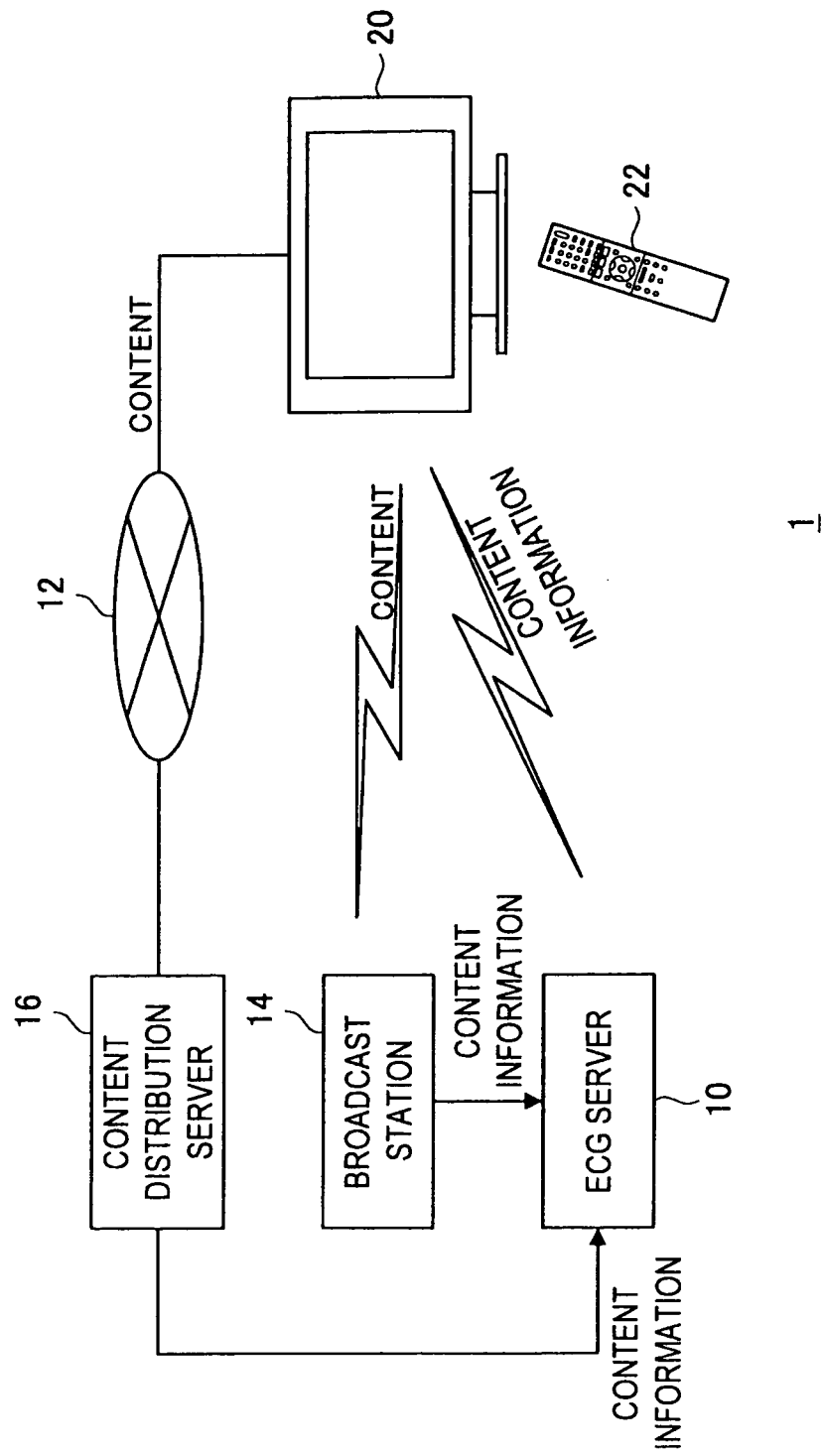
FIG. 1 is an explanatory view showing a configuration of an information processing system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Preferred embodiments of the present invention will be described hereinafter in the following order.

1. Configuration of Information Processing System According to Embodiment of Present Invention
2. First Embodiment
 2-1. Configuration of ECG Server
 2-2. Configuration of Client Terminal According to First Embodiment
 2-3. Operation According to First Embodiment
 2-4. Alternative Examples
3. Second Embodiment
 3-1. Configuration of Client Terminal According to Second Embodiment
 3-2. Operation According to Second Embodiment
4. Third Embodiment
5. Alternative Examples of Content List Screen
 5-1. First Alternative Example
 5-2. Second Alternative Example
 5-3. Third Alternative Example
6. Supplementary Explanation <1. Configuration of Information Processing System According to Embodiment of Present Invention>

An information processing system 1 according to an embodiment of the present invention is described hereinafter with reference to FIG. 1.

FIG. 1 is an explanatory view showing a configuration of the information processing system 1 according to the embodiment of the present invention. Referring to FIG. 1, the information processing system 1 according to the embodiment includes an ECG (Electronic Content Guide) server 10, a network 12, a broadcast station 14, a content distribution server 16, a client terminal 20, and a remote controller 22.

The broadcast station 14 broadcasts a content entity (content data). Although the case where the broadcast station broadcasts a content by radio is shown in FIG. 1, the broadcast station 14 may broadcast a content by wire.

Specifically, the broadcast station 14 may perform digital terrestrial broadcasting, cable television broadcasting, BS (Broadcasting Satellite) digital broadcasting, CS (Communication Satellite) digital broadcasting or the like.

Note that, although the case where the content is a program is mainly described in this specification, the content is not limited thereto. For example, the content may be video data such as commercial or movie, music data, still image data, game, software, an electronic book, commercial goods such as CD, DVD or a book, person information such as a television personality or an actor, location and position information such as a program's filming site or an introduced store, a Web site such as an official site or the like.

The content distribution server 16 transmits a content entity (content data) through the network 12. The content distribution server 16 may transmit a content by downloading or streaming, for example. Note that the network 12 is a wired or wireless transmission channel of information which is transmitted from a device connected to the network 12. For example, the network 12 may include a public network such as the Internet, a telephone line network or a satellite communications network, or a leased line network such as various kinds of LAN (Local Area Network) including Ethernet (registered trademark), WAN (Wide Area Network) or IP-VPN (Internet Protocol-Virtual Private Network).

Contents holders such as the broadcast station 14 and the content distribution server 16 also have content information of each program. The content information held by each contents holder is provided to the ECG server 10 and managed by the ECG server 10. The content information (attribute information) includes basic information such as a title and a representative image URI, cast information such as a cast name and a cast image URI, broadcast time information, genre information or the like, for example. The content information may be managed as facet data that contains a plurality of facet items (facet categories) which are mutually exclusive categories and facet values which belong to each of the plurality of facet items.

The ECG server 10 (server device) manages (stores) content information for each content broadcasted from the broadcast station 14 or each content distributed from the content distribution server 16. Further, the ECG server 10 can search for content information of a content relevant to the content selected in the client terminal 20 and transmit the content information to the client terminal 20, for example. Note that the ECG server 10 may be a Web server that transmits content information through the network 12 in response to a request from the client terminal 20.

The client terminal 20 (display control device) receives the content broadcasted from the broadcast station 14, the content distributed from the content distribution server 16 or the like and reproduces and displays the contents. The client terminal 20 operates according to a user operation which is performed on the remote controller 22. For example, a user can control the client terminal 20 by performing a channel selection operation, a content selection operation, a viewing reservation operation, a recording reservation operation, or a playback control operation such as fast-forward or pause on the remote controller 22.

Further, the client terminal 20 according to the embodiment creates a content list screen (display screen) that contains display information of contents based on the content information received from the ECG server 10. Hereinafter, specific examples of the content list screen created by the client terminal 20 are described with reference to FIGS. 2 to 4.

Figure 2:
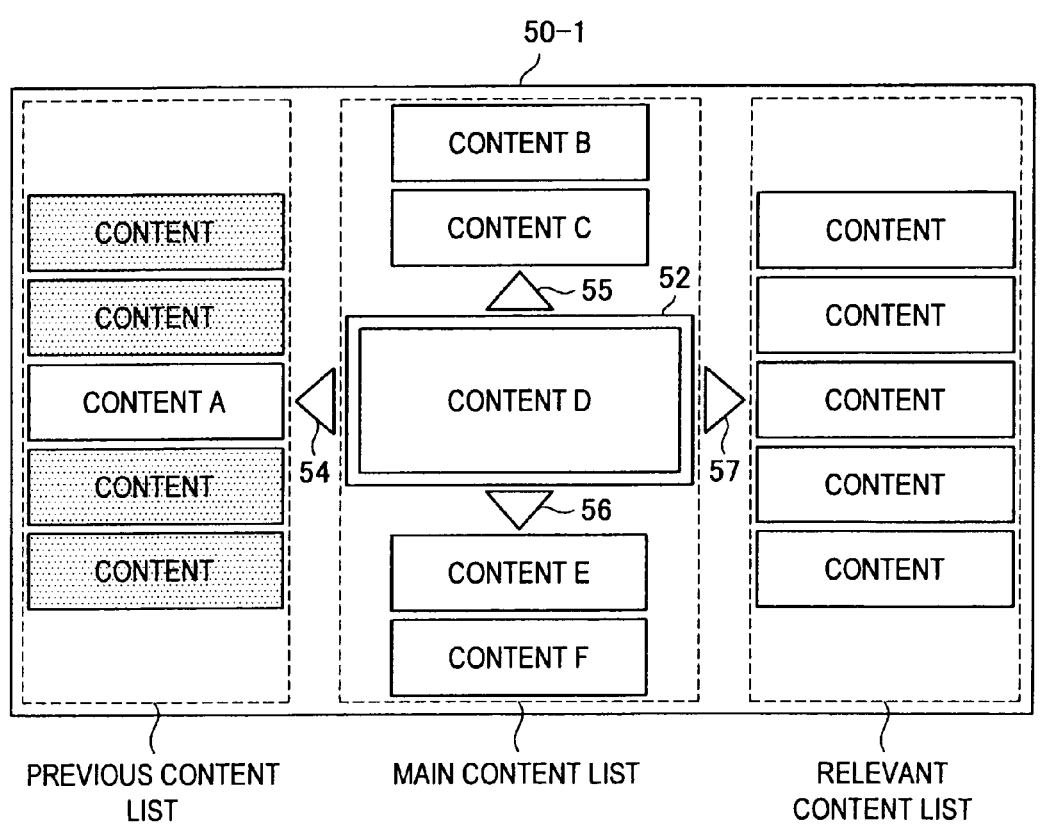
FIG. 2 is an explanatory view showing a specific example of a content list screen created by a client terminal.
Figure 3:
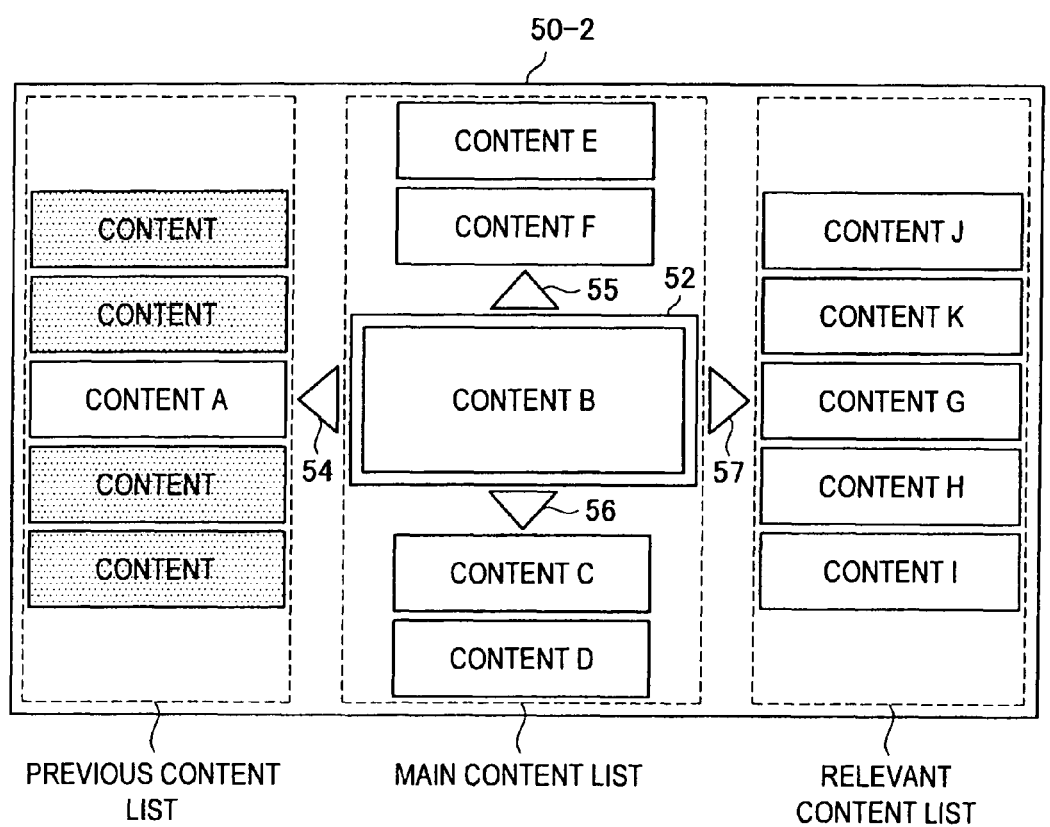
FIG. 3 is an explanatory view showing a specific example of a content list screen created by a client terminal.
Figure 4:
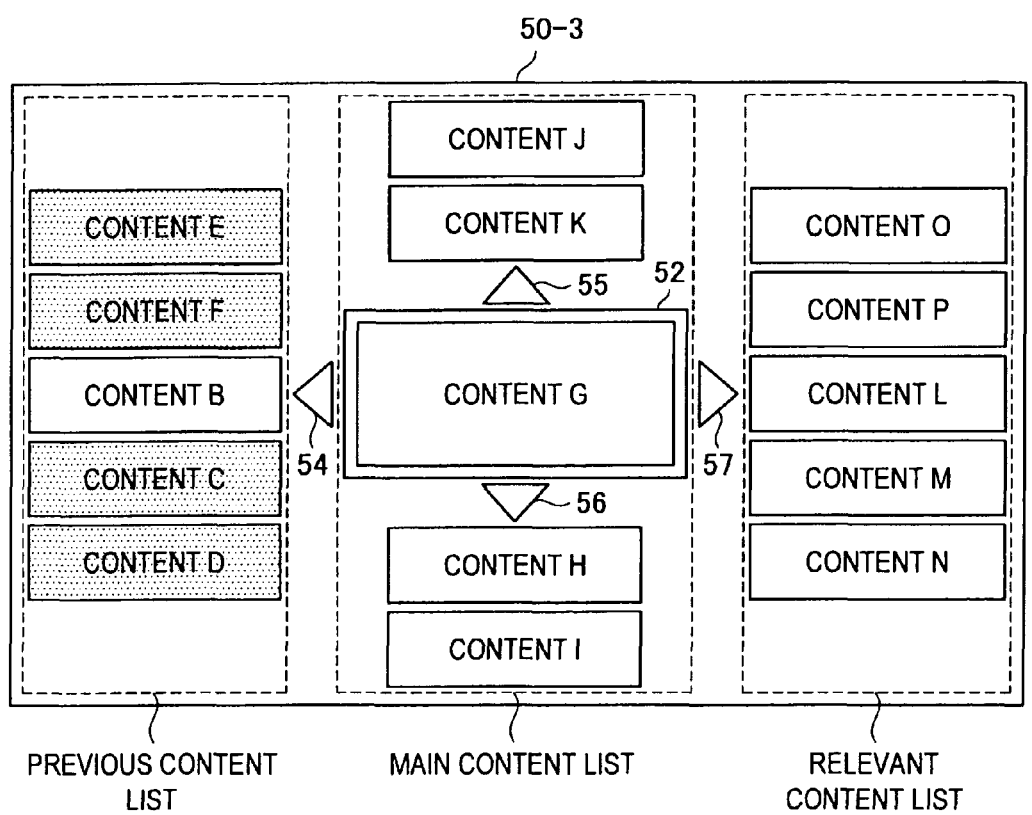
FIG. 4 is an explanatory view showing a specific example of a content list screen created by a client terminal.

FIGS. 2 to 4 are explanatory views showing specific examples of the content list screen created by the client terminal 20. Referring to FIG. 2, a content list screen 50-1 contains a previous content list, a main content list and a relevant content list.

The previous content list is a main content list in the immediately previous content list screen, and it includes display information of a plurality of contents. Note that the display information may be text information such as a content title or cast name, or an image (e.g. a representative image, a cast image etc.) related to the content.

The main content list is a content list for a user to select a content at the current point of time, and it includes display information of a plurality of contents. The display information of contents included in the main content list is display information of contents which are relevant to the content that has been selected in the previous content list. For example, the main content list shown in FIG. 2 includes display information of contents B to F, and the contents B to F are contents which are relevant to the content A that has been selected in the previous content list.

The relevant content list includes display information of contents which are relevant to the content on which a cursor 52 is put in the main content list. For example, the relevant content list shown in FIG. 2 includes display information of a plurality of contents, and the plurality of contents are contents which are relevant to the content D on which the cursor 52 is put in the main content list.

A user can select any of the display information of the contents B to F by controlling an up key 55 or a down key 56 and moving the cursor 52 on the content list screen 50-1 shown in FIG. 2. When the display information of the content B is selected by the user, for example, the client terminal 20 creates a next content list screen 50-2 as shown in FIG. 3.

Referring to FIG. 3, when the display information of the content B is selected in the main content list, the display information of the contents in the relevant content list are changed to display information of contents G to K which are relevant to the content B.

A user can determine the selection of the content B by controlling a right key 57 on the content list screen 50-2 shown in FIG. 3. When the selection of the content B is determined by a user, the client terminal 20 creates a next content list screen 50-3 as shown in FIG. 4.

Referring to FIG. 4, the content list screen 50-3 includes, as its previous content list, the main content list in the content list screen 50-2 and includes, as its main content list, the relevant content list in the content list screen 50-2. A user can select any of the display information of the contents G to K which are relevant to the content B by controlling the up key 55 or the down key 56 and moving the cursor 52 on the content list screen 50-3.

Further, the content list screen 50-3 includes a relevant content list that includes display information of contents L to P which are relevant to the content G on which the cursor 52 is put in the main content list.

In this manner, each time a content is selected in the main content list, the client terminal 20 creates the content list screen 50 that includes display information of contents which are relevant to the selected content. Thus, a user can search the relevant contents in a chained manner through the content list screens 50 which are generated one after another by the client terminal 20.

Further, according to a first embodiment, a second embodiment and a third embodiment of the present invention, it is possible to control the display details of the relevant content list according to the selection sequence of previously selected contents. Hereinafter, the overviews of the first embodiment, the second embodiment and the third embodiment of the present invention are described, and the details of the respective embodiments are described after that.

(Overview of First Embodiment)

According to the first embodiment, it is possible to control the details of display information of each content to be displayed on the content list screen according to the selection sequence of previously selected contents. This is described specifically hereinafter with reference to FIG. 5.

Figure 5:
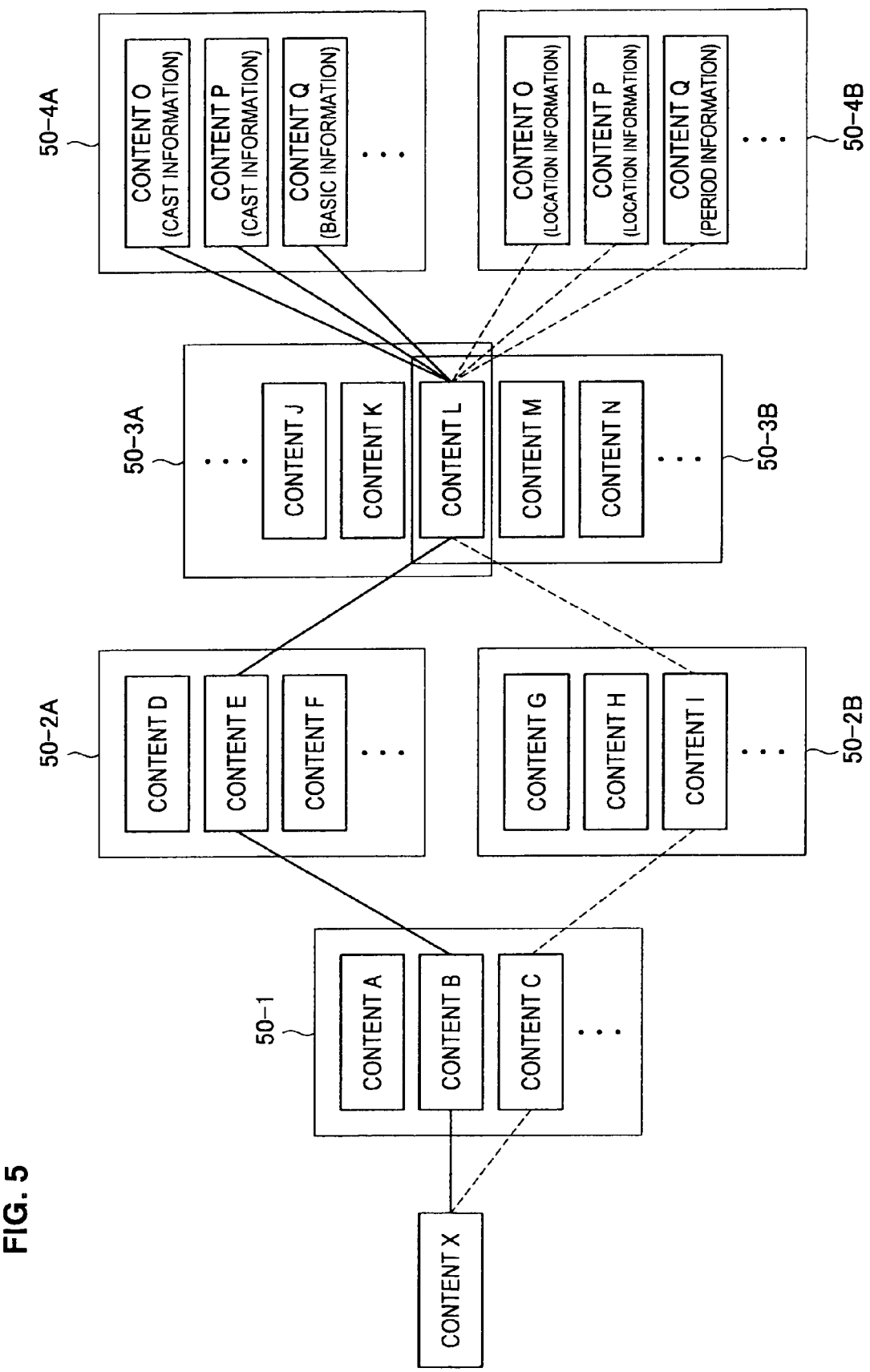
FIG. 5 is an explanatory view showing an overview of a first embodiment.

FIG. 5 is an explanatory view showing the overview of the first embodiment. A content list screen 50-1 contains display information of contents A to C which are relevant to a content X. When the display information of the content B is selected on the content list screen 50-1, the client terminal creates a next content list screen 50-2A that contains display information of contents D to F which are relevant to the content B. Further, when the display information of the content E is selected on the content list screen 50-2A, the client terminal 20 creates a next content list screen 50-3A that contains display information of contents J to L which are relevant to the content E.

On the other hand, when the display information of the content C is selected on the content list screen 50-1, the client terminal 20 creates a next content list screen 50-2B that contains display information of contents G to I which are relevant to the content C. Further, when the display information of the content I is selected on the content list screen 50-2B, the client terminal 20 creates a next content list screen 50-3B that contains display information of contents L to M which are relevant to the content I.

Because the content list screen 50-3A and the content list screen 50-3B both contain the display information of the content L, a user can select the display information of the content L on any of those screens. However, the selection sequence of the past contents is different between the case of selecting the display information of the content L on the content list screen 50-3A and the case of selecting the display information of the content L on the content list screen 50-3B.

Specifically, in the case of selecting the display information of the content L on the content list screen 50-3A, the selection sequence of the past contents is in the order of the content X, the content B, the content E, and the content L as shown in the full line in FIG. 5. On the other hand, in the case of selecting the display information of the content L on the content list screen 50-3B, the selection sequence of the past contents is in the order of the content X, the content C, the content I, and the content L as shown in the dotted line in FIG. 5.

Therefore, the client terminal 20 according to the first embodiment creates different content list screens between the case where the display information of the content L is selected on the content list screen 50-3A and the case where the display information of the content L is selected on the content list screen 50-3B.

For example, in the case where the display information of the content L is selected on the content list screen 50-3A, the client terminal 20 according to the first embodiment creates a content list screen 50-4A that contains display information of contents O to Q which are relevant to the content L. In the content list screen 50-4A, cast information (e.g. a cast image) of the content O is contained as the display information of the content O, cast information of the content P is contained as the display information of the content P, and basic information of the content Q is contained as the display information of the content Q.

On the other hand, in the case where the display information of the content L is selected on the content list screen 50-3B also, a content list screen 50-4B that contains display information of contents O to Q which are relevant to the content L is created. However, the display information contained in the content list screen 50-4B is different in details and kinds from the display information contained in the content list screen 50-4A.

Specifically, in the content list screen 50-4B, location information of the content O is contained as the display information of the content O, location information of the content P is contained as the display information of the content P, and period information of the content Q is contained as the display information of the content Q.

As described above, according to the first embodiment, the details of display information of contents which are displayed on the content list screen are controlled according to the past content selection sequence, thereby improving the appealing effect to a user by the display information of each content. A control method of the display information according to the first embodiment is described in detail later in "2. First Embodiment".

(Overview of Second Embodiment)

According to the second embodiment, it is possible to control for which contents the display information is to be displayed on the content list screen according to the selection sequence of previously selected contents. This is described specifically hereinafter with reference to FIG. 6.

Figure 6:
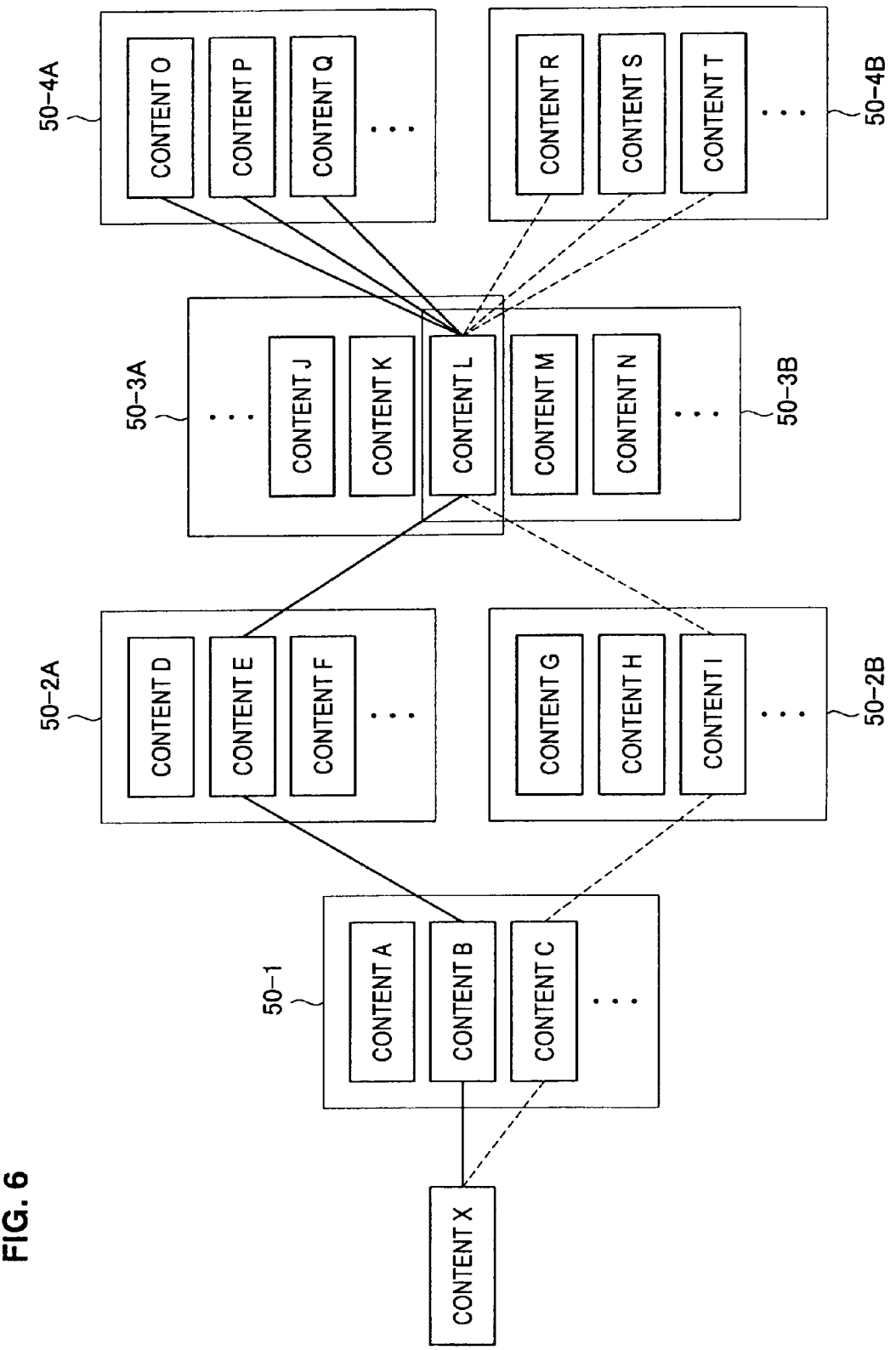
FIG. 6 is an explanatory view showing an overview of a second embodiment.

FIG. 6 is an explanatory view showing the overview of the second embodiment. The content list screens 50-1, 50-2A, 50-3A, 50-2B and 50-3B shown in FIG. 6 are the same as those shown in FIG. 5, and detailed explanation thereof is omitted.

Referring to FIG. 6, because the content list screen 50-3A and the content list screen 50-3B both contain the display information of the content L, a user can select the display information of the content L on any of those screens. However, the selection sequence of the past contents is different between the case of selecting the display information of the content L on the content list screen 50-3A and the case of selecting the display information of the content L on the content list screen 50-3B.

Therefore, the client terminal 20 according to the second embodiment creates different content list screens between the case where the display information of the content L is selected on the content list screen 50-3A and the case where the display information of the content L is selected on the content list screen 50-3B.

For example, in the case where the display information of the content L is selected on the content list screen 50-3A, the client terminal 20 creates a content list screen 50-4A that contains display information of contents O to Q as relevant contents to the content L. On the other hand, in the case where the display information of the content L is selected on the content list screen 50-3B, the client terminal 20 creates a content list screen 50-4B that contains display information of contents R to T as relevant contents to the content L.

As described above, according to the second embodiment, the display information of the contents which are determined to have the high appealing effect to a user can be displayed on the content list screen according to the selection sequence of previously selected contents. A control method of the display information according to the second embodiment is described in detail later in "3. Second Embodiment".

(Overview of Third Embodiment)

The third embodiment is combination of the first embodiment and the second embodiment. Specifically, according to the third embodiment, it is possible to control for which contents the display information is to be displayed on the content list screen and the details of the display information of the respective contents according to the selection sequence of previously selected contents. This is described specifically hereinafter with reference to FIG. 7.

Figure 7:
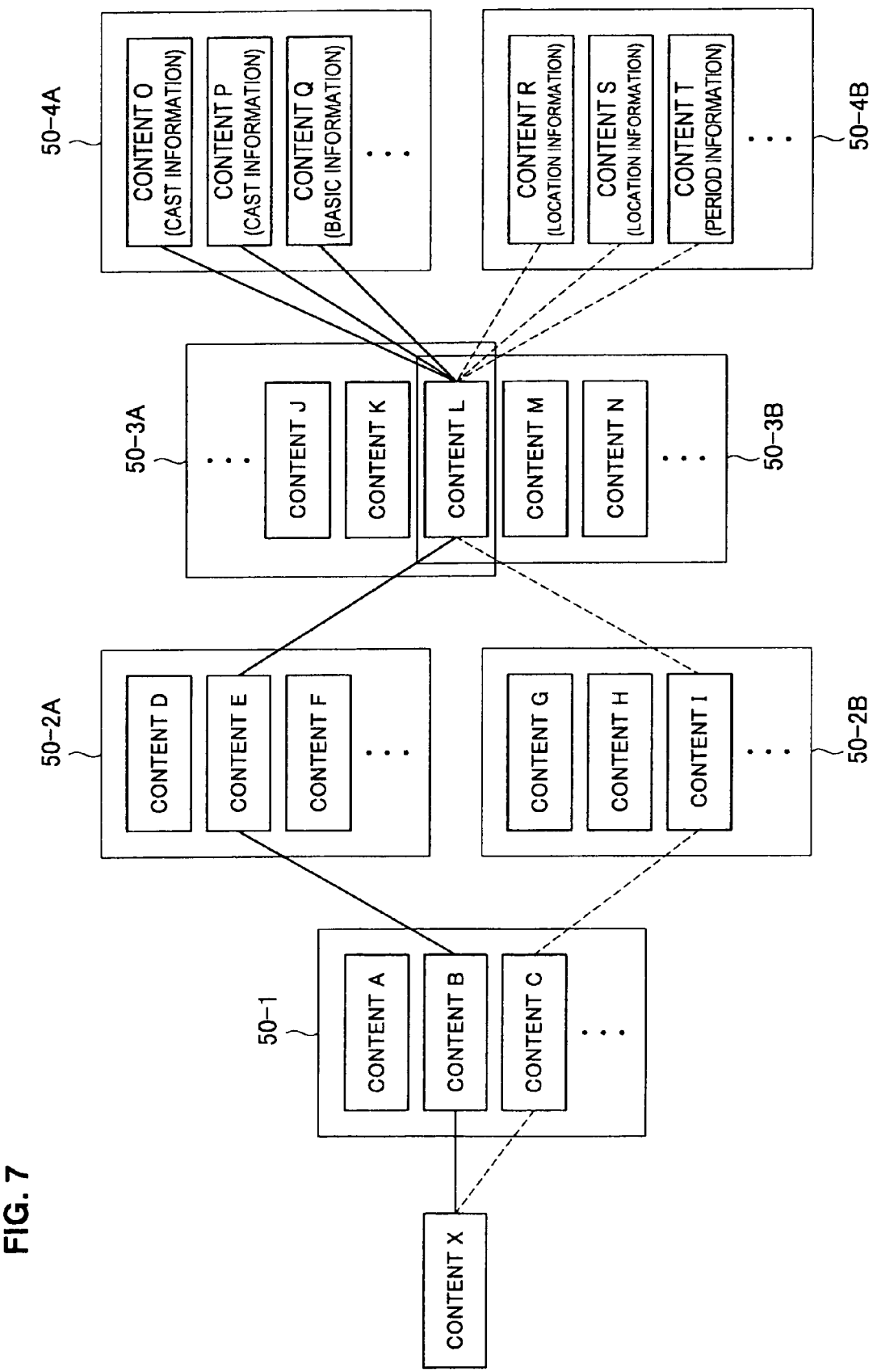
FIG. 7 is an explanatory view showing an overview of a third embodiment.

FIG. 7 is an explanatory view showing the overview of the third embodiment. The content list screens 50-1, 50-2A, 50-3A, 50-2B and 50-3B shown in FIG. 7 are the same as those shown in FIG. 5, and detailed explanation thereof is omitted.

Referring to FIG. 7, because the content list screen 50-3A and the content list screen 50-3B both contain the display information of the content L, a user can select the display information of the content L on any of those screens. However, the selection sequence of the past contents is different between the case of selecting the display information of the content L on the content list screen 50-3A and the case of selecting the display information of the content L on the content list screen 50-3B.

Therefore, the client terminal 20 according to the third embodiment creates different content list screens between the case where the display information of the content L is selected on the content list screen 50-3A and the case where the display information of the content L is selected on the content list screen 50-3B.

Specifically, in the case where the display information of the content L is selected on the content list screen 50-3A, the client terminal 20 creates a content list screen 50-4A that contains display information of contents O to Q as relevant contents to the content L. Further, in the content list screen 50-4A, cast information of the content O is contained as the display information of the content O, cast information of the content P is contained as the display information of the content P, and basic information of the content Q is contained as the display information of the content Q.

On the other hand, in the case where the display information of the content L is selected on the content list screen 50-3B, the client terminal 20 creates a content list screen 50-4B that contains display information of contents R to T as relevant contents to the content L. Further, in the content list screen 50-4B, location information of the content R is contained as the display information of the content R, location information of the content S is contained as the display information of the content S, and period information of the content T is contained as the display information of the content T.

As described above, according to the third embodiment, for which contents the display information is to be displayed on the content list screen can be controlled according to the selection sequence of previously selected contents. Further, according to the third embodiment, the details of the display information of the respective contents can be controlled according to the selection sequence of previously selected contents. A control method of the display information according to the third embodiment is described in detail later in "4. Third Embodiment".

It should be noted that the client terminal 20 according to the first to third embodiments can be implemented by a common hardware configuration. Hereinafter, an example of the hardware configuration of the client terminal 20 which can be used in common among those embodiments is described.

Figure 8:
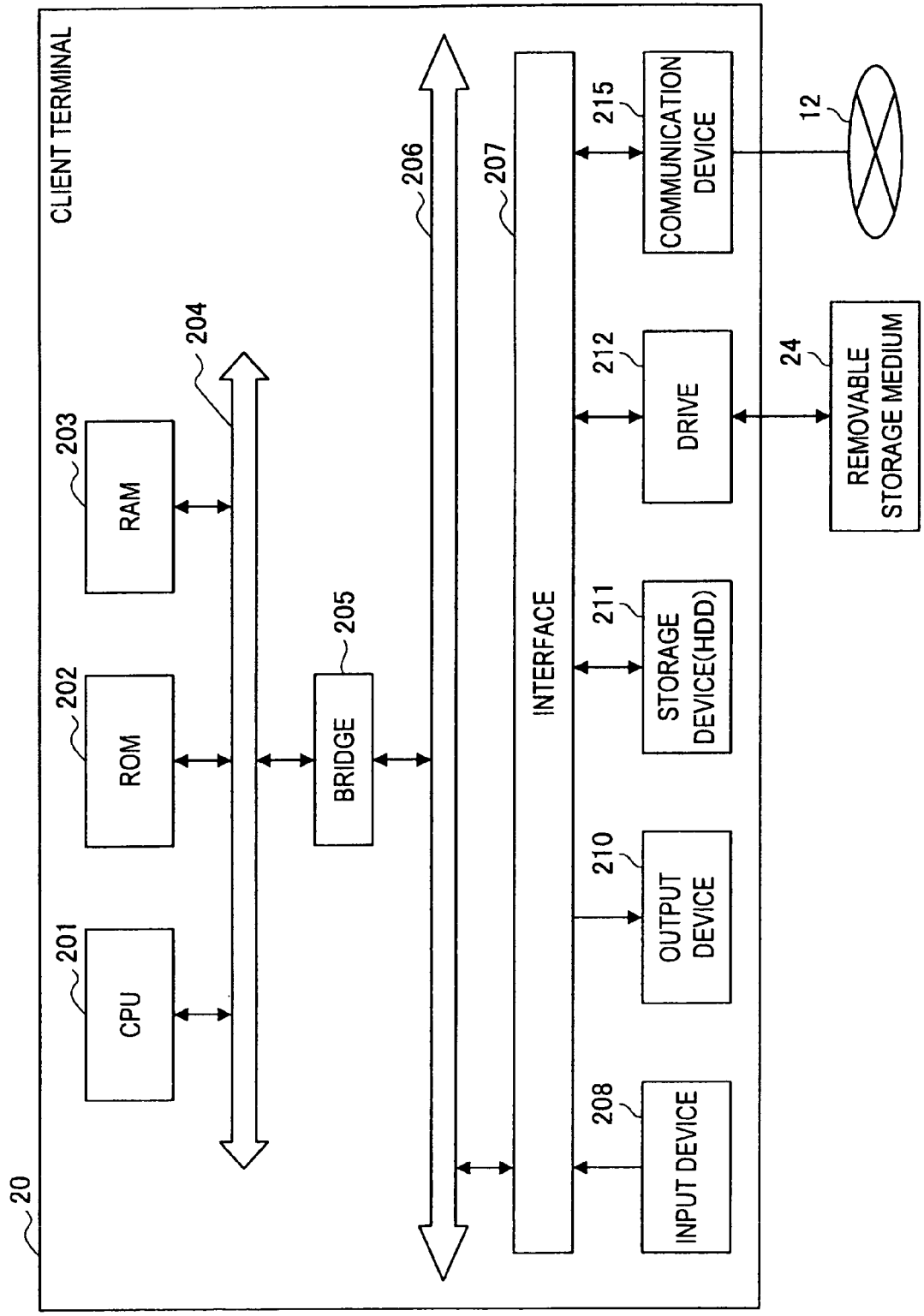
FIG. 8 is a block diagram showing a hardware configuration of a client terminal.

FIG. 8 is a block diagram showing a hardware configuration of the client terminal 20. The client terminal 20 includes a CPU (Central Processing Unit) 201, a ROM (Read Only Memory) 202, a RAM (Random Access Memory) 203, and a host bus 204. The client terminal 20 further includes a bridge 205, an external bus 206, an interface 207, an input device 208, an output device 210, a storage device (HDD) 211, a drive 212, and a communication device 215.

The CPU 201 serves as a processing device and a control device, and it controls the overall operations in the client terminal 20 according to various kinds of programs. The CPU 201 may be a microprocessor. The ROM 202 stores a program to be used by the CPU 201, a processing parameter and so on. The RAM 203 temporarily stores a program to be used in the execution on the CPU 201, a parameter that varies in the execution and so on. The CPU 201, the ROM 202 and the RAM 203 are connected through the host bus 204, which may be a CPU bus or the like.

The host bus 204 is connected to the external bus 206 such as a PCI (Peripheral Component Interconnect/Interface) bus via the bridge 205. Note that the host bus 204, the bridge 205 and the external bus 206 are not necessarily separated from one another, and their functions may be implemented by one bus.

The input device 208 may include an input means for a user to input information, such as a mouse, a keyboard, a touch panel, a button, a microphone, a switch, a lever, a photoreceptor for infrared ray signals generated in the remote controller 22 or a receiver of radio signals, and an input control circuit to generate an input signal based on a user input and output it to the CPU 201, for example. A user of the client terminal 20 manipulates the input device 208 to thereby input various kinds of data or direct a processing operation to the client terminal 20.

The output device 210 includes a display device such as a CRT (Cathode Ray Tube) display device, an LCD (Liquid Crystal Display) device, an OLED (Organic Light Emitting Display) device or a lamp. Further, the output device 210 includes a sound output device such as a speaker or a headphone. The output device 210 outputs reproduced contents, for example. Specifically, the display device displays various kinds of information such as reproduced video data by texts or images. On the other hand, the sound output device converts reproduced sound data or the like into sound and outputs the sound.

The storage device 211 is a device for data storage that is configured as an example of a storage unit of the client terminal 20 according to the embodiment. The storage device 211 may include a storage medium, a recording device that records data into the storage medium, a reading device that reads data from the storage medium, a deleting device that deletes data recorded in the storage medium or the like. The storage device 211 may be an HDD (Hard Disc Drive), for example. The storage device 211 drives a hard disk and stores a program to be executed by the CPU 201 or various data.

The drive 212 is a reader/writer for a storage medium, and it may be built in the client terminal 20 or attached externally. The drive 212 reads information that is recorded on a removable storage medium 24 such as a magnetic disk, an optical disk, a magneto-optical disk or a semiconductor memory which is attached thereto and outputs the information to the RAM 203. Further, the drive 212 may write information into the removable storage medium 24.

The communication device 215 is a communication interface that includes a communication device or the like to establish connection with the communication network 12, for example. The communication device 215 may be a communication device compatible with a wireless LAN (Local Area Network) or a wired communication device that performs wired communication.

The hardware configuration of the client terminal 20 is described above with reference to FIG. 8. A hardware configuration of the ECG server 10 may be substantially the same as that of the client terminal 20, and explanation thereof is omitted.

Note that a home display device is shown in FIG. 1 as an example of the client terminal 20, the client terminal 20 is not limited thereto. For example, the client terminal may be an information processing device such as a PC (Personal Computer), a home video processing device (e.g. a DVD recorder, a videocassette recorder etc.), a PDA (Personal Digital Assistants), a home game device, or an electrical household appliance. Further, the client terminal 20 may be an information processing device such as a mobile phone, a PHS (Personal Handyphone System), a portable music playback device, a portable video processing device, or a portable game device.

<2. First Embodiment>

The information processing system 1 according to the embodiments of the present invention and the overview of the respective embodiments are described above. Hereinafter, the first embodiment of the present invention is described in detail.

(2-1. Configuration of ECG Server)

Figure 9:
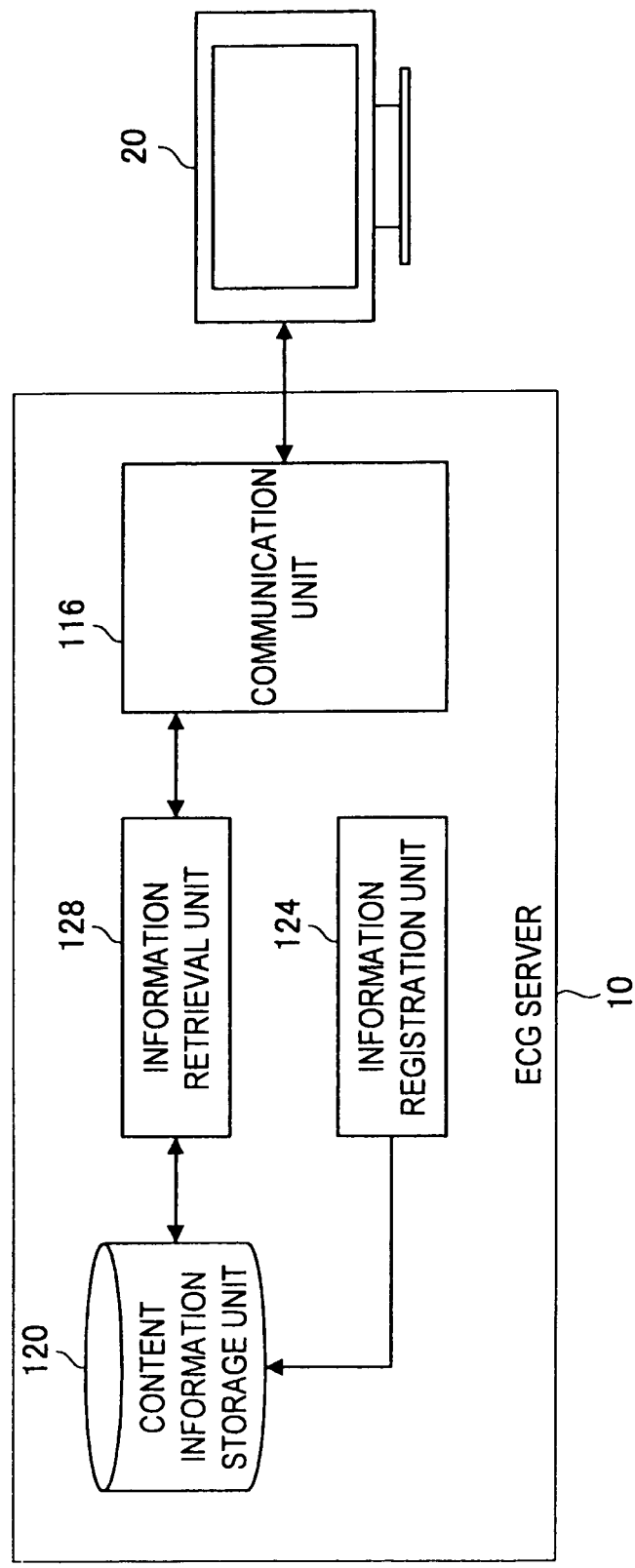
FIG. 9 is a functional block diagram showing a configuration of an ECG server.

FIG. 9 is a functional block diagram showing the configuration of the ECG server 10. Referring to FIG. 9, the ECG server 10 includes a communication unit 116, a content information storage unit 120, an information registration unit 124, and an information retrieval unit 128.

The communication unit 116 is an interface with the client terminal 20, and functions as a transmitting unit and a receiving unit that respectively transmits and receives various kinds of information with the client terminal 20. For example, the communication unit 116 receives content identifying information from the client terminal 20 and transmits content information retrieved by the information retrieval unit 128 to the client terminal 20.

The content information storage unit 120 stores content information for each content broadcasted from the broadcast station 14 or each content distributed from the content distribution server 16. The content information is registered into the content information storage unit 120 automatically or manually by the information registration unit 124. The structure of the content information is described with reference to FIG. 10.

Figure 10:
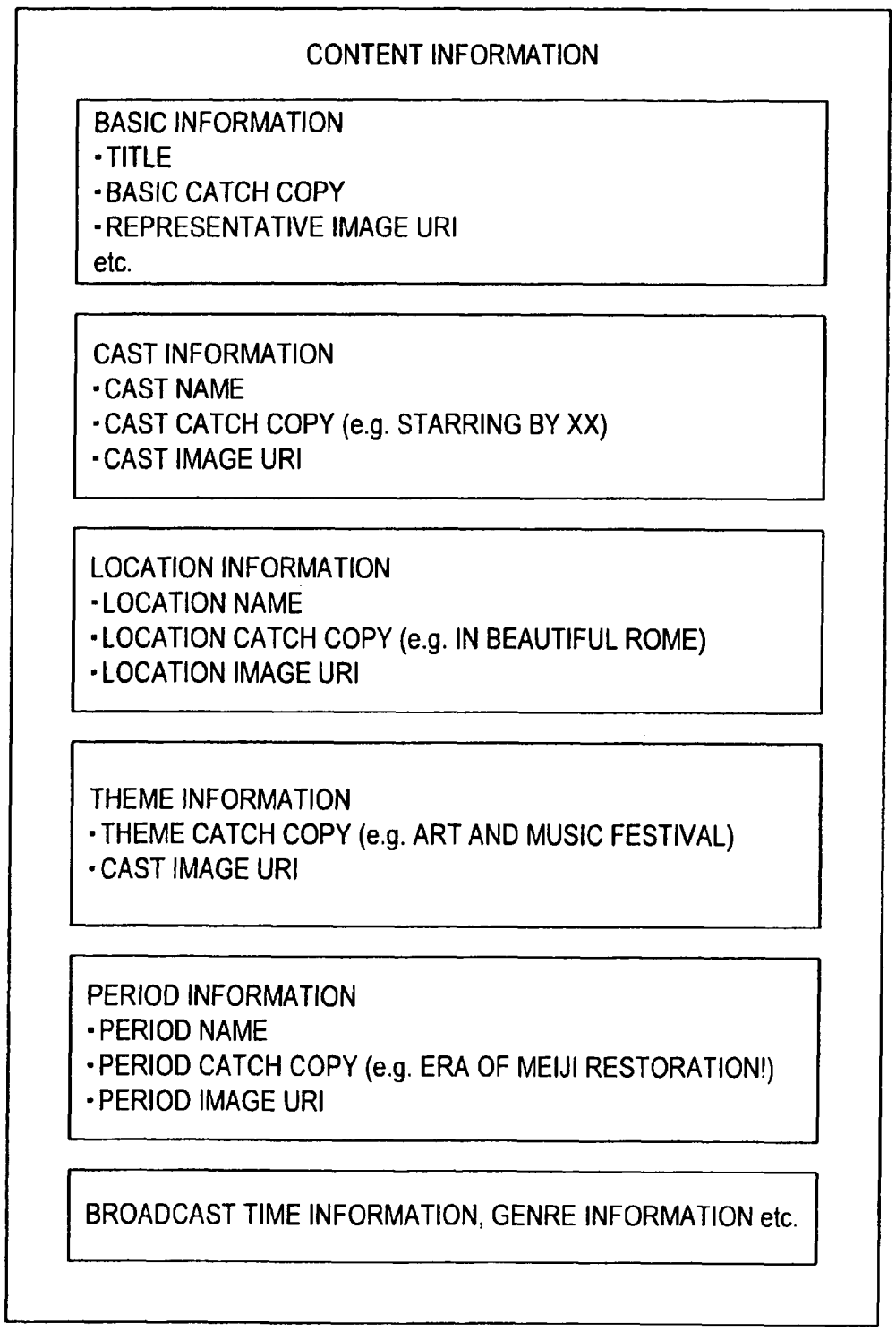
FIG. 10 is an explanatory view showing an exemplary structure of content information.

FIG. 10 is an explanatory view showing an exemplary structure of content information. Referring to FIG. 10, the content information includes attribute information related to a plurality of attribute classifications. Specifically, the content information includes attribute information such as basic information, cast information, location information, theme information, period information, broadcast time information and genre information. Further, each of the attribute information includes an attribute value, a catch copy, an image URI or the like. For example, the cast information includes a content's cast name, a cast catch copy (e.g. "Starring by ○○!"), and a cast image URI.

The information retrieval unit 128 retrieves, from the content information storage unit 120, content information of a content which is relevant to the content identified by the content identifying information received from the client terminal 20.

Specifically, the information retrieval unit 128 may retrieve a content having an attribute value which is common to the content identified by the content identifying information. For example, when the cast information of the content identified by the content identifying information is "B", the location information is "Kyoto", and the period information is "Edo Period", the information retrieval unit 128 may retrieve the content whose cast information is "B", the content whose location information is "Kyoto", and the content whose period information is "Edo Period". Alternatively, the information retrieval unit 128 may retrieve the content whose cast information is "B", location information is "Kyoto", and period information is "Edo Period". Note that the information retrieval unit 128 may set search conditions so that the number of retrieved contents is a predetermined number or within a predetermined range.

(2-2. Configuration of Client Terminal According to First Embodiment)

Figure 11:
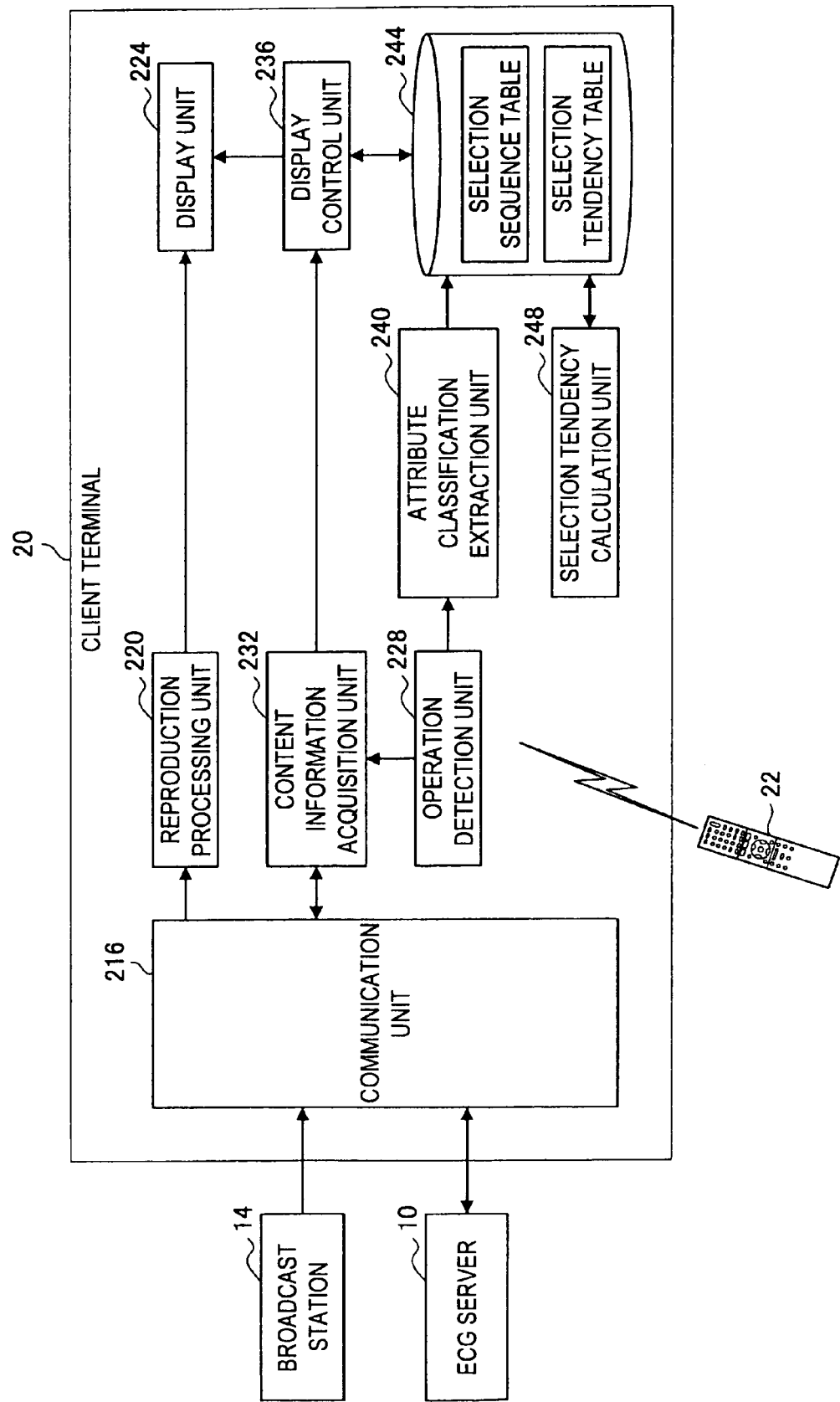
FIG. 11 is a functional block diagram showing a configuration of a client terminal according to the first embodiment.

FIG. 11 is a functional block diagram showing the configuration of the client terminal 20 according to the first embodiment. Referring to FIG. 11, the client terminal 20 according to the first embodiment includes a communication unit 216, a reproduction processing unit 220, a display unit 224, an operation detection unit 228, a content information acquisition unit 232, a display control unit 236, an attribute classification extraction unit 240, a table storage unit 244, and a selection tendency calculation unit 248.

The communication unit 216 is an interface with external parties such as the ECG server 10, the broadcast station 14 and the content distribution server 16. The communication unit 216 can receive contents from the broadcast station 14 and the content distribution server 16 and receive content information from the ECG server 10.

The reproduction processing unit 220 performs reproduction processing of the content received by the communication unit 216. The reproduction processing may be decoding, A/D conversion, rendering or the like. The content reproduced by the reproduction processing unit 220 is displayed on the display unit 224.

The operation detection unit 228 detects a user operation by receiving a signal indicating the user operation performed on the remote controller 22 from the remote controller 22. The user operation may be selection of a content on the content list screen 50, for example. Further, the operation detection unit 228 may detect a user operation performed on an operating means which is placed in the client terminal 20, not only a user operation performed on the remote controller 22.

The content information acquisition unit 232 acquires, from the ECG server 10, content information of relevant contents to the content selected by a user in the main content list of the content list screen 50.

Specifically, the content information acquisition unit 232 transmits content identifying information for identifying the content selected by a user in the main content list to the ECG server 10 as a content information acquisition request. The content identifying information may be a content ID, a media type, a channel number, broadcast time or the like.

For example, when the content B is selected by a user on the content list screen 50 shown in FIG. 2, the content information acquisition unit 232 may acquire the content information of relevant contents to the content B from the ECG server 10 by transmitting the content identifying information that identifies the content B to the ECG server 10. Alternatively, the content information acquisition unit 232 may acquire the content information of relevant contents to each of the contents included in the main content list prior to the user selection.

The display control unit 236 creates a content list screen based on the content information acquired from the ECG server 10 by the content information acquisition unit 232, the user operation detected by the operation detection unit 228 or the like.

Specifically, the display control unit 236 creates the content list screen that contains the main content list composed of display information of a plurality of contents based on the content information acquired from the ECG server 10. The display information of contents may include the title, cast name, location name or the like included in the content information or include a representative image, a cast image or a location image acquired based on the image URI included in the content information.

Then, when display information of one content is selected in the main content list, the display control unit 236 creates the next content list screen that contains the relevant content list composed of display information of a plurality of contents relevant to the one content. The content screen created by the display control unit 236 in this manner is displayed on the display unit 224.

The display control unit 236 may preferentially incorporate the display information related to the attribute classification on which a user tends to focus attention when selecting a content, as the display information of each of the contents relevant to one content, into the relevant content list For example, when a user tends to select a content in relation to the cast, the display control unit 236 can include the cast image into the relevant content list as the display information of the content. Structures for determining the attribute classification on which a user tends to focus attention when selecting a content (the attribute classification extraction unit 240, the table storage unit 244 and the selection tendency calculation unit 248) are described hereinbelow.

When a content is selected by a user in the main content list, the attribute classification extraction unit 240 generates log information of the content selected in the main content list (which is referred to hereinafter as the main content). Specifically, the attribute classification extraction unit 240 extracts an attribute value which is common to the main content and the immediately previous main content which has been selected in the immediately previous main content list and an attribute classification of the attribute value, and generates log information that includes the extracted attribute classification and attribute value. Then, the attribute classification extraction unit 240 adds the generated log information to a selection sequence table stored in the table storage unit 244.

FIG. 12 is an explanatory view showing a specific example of the selection sequence table stored in the table storage unit 244. Referring to FIG. 12, the selection sequence table is composed of a plurality of log information, and each of the log information includes a log ID, a main content ID, an attribute classification whose attribute value is common to the immediately previous main content, the attribute value common to the immediately previous main content, and log acquisition date and time.

For example, in the log information to which the log ID "0002" is assigned, the main content is "content B", the attribute classification whose attribute value is common to the immediately previous main content "content A" is "cast", the common attribute value is "A", and the acquisition date and time is "2009-11-01 10:10:20".

Note that, when the main content is changed within the same main content list by cursor movement, the attribute classification extraction unit 240 may modify the log information to the log information of the changed main content. For example, when the content Y is selected in the main content list that includes the contents X and Y, the log information (log ID: 0123) of the content Y is added to the selection sequence table. After that, when the content X is selected by cursor movement in the main content list, the attribute classification extraction unit 240 may modify the log information (log ID: 0123) of the content Y to the log information of the content X.

Further, the table storage unit 244 that stores the above-described selection sequence table and a selection tendency table, which is described later, may be a storage medium such as nonvolatile memory, a magnetic disk, an optical disc or an MO (Magneto Optical) disk. Examples of the nonvolatile memory are EEPROM (Electrically Erasable Programmable Read-Only Memory), EPROM (Erasable Programmable ROM) and so on. Examples of the magnetic disk are a hard disk, a discoid magnetic disk and so on. Examples of the optical disc are CD (Compact Disc), DVD-R (Digital Versatile Disc Recordable), BD (Blu-ray Disc (registered trademark)) and so on.

The selection tendency calculation unit 248 (calculation unit) calculates a tendency that a user selects a relevant content to one content in relation to each attribute classification based on the selection sequence table. A calculation example of a user's selection tendency is described hereinafter with reference to FIGS. 13 and 14.

FIG. 13 is an explanatory view schematically showing the number of relevant contents selected in relation to each attribute classification. In the example shown in FIG. 13, the number of relevant contents selected in relation to the period is 14, the number of relevant contents selected in relation to the cast is 12, the number of relevant contents selected in relation to the location is 6, the number of relevant contents selected in relation to the theme is 5, and the number of relevant contents selected in relation to the broadcast time is 3. In this case, because the number of relevant contents selected in relation to the period is the largest, the selection tendency calculation unit 248 may determine that the selection tendency in relation to the period is the highest.

However, there is a possibility that a user's selection tendency changes with time. Thus, the selection tendency calculation unit 248 may calculate the selection tendency by using only the log information of the latest predetermined number of steps (selection of one relevant content from the main content is counted as one step). For example, the selection tendency calculation unit 248 may calculate the ratio of the selected number in relation to each attribute classification in the latest 20 steps as the selection tendency.

Specifically, in the latest 20 steps, the number of relevant contents selected in relation to the cast is 9, the number of relevant contents selected in relation to the period is 5, the number of relevant contents selected in relation to the location is 3, the number of relevant contents selected in relation to the theme is 2, and the number of relevant contents selected in relation to the broadcast time is 1.

Therefore, in the case of using only the log information of the latest 20 steps, the selection tendency calculation unit 248 calculates the selection tendency in relation to the cast as "45%", the selection tendency in relation to the period as "25%", the selection tendency in relation to the location as "15%", the selection tendency in relation to the theme as "10%", and the selection tendency in relation to the broadcast time as "5%" as shown in FIG. 14.

The selection tendency with respect to each attribute classification which is calculated by the selection tendency calculation unit 248 in the above manner is recorded as a selection tendency table into the table storage unit 244. Note that the selection tendency calculation unit 248 may update the selection tendency table each time new log information is added to the selection sequence table. Further, the calculation method of the selection tendency is not limited to the above example, and calculation methods described later in "2-4. Alternative Examples" may be used, for example.

The display control unit 236 controls the display information to be incorporated into the relevant content list by referring to the selection tendency table stored in the table storage unit 244. For example, the display control unit 236 determines the attribute classification with the highest selection tendency among the attribute classifications whose attribute values are common to the main content with respect to each relevant content. Then, the display control unit 236 incorporates the display information related to the attribute classification with the highest selection tendency among the attribute classifications whose attribute values are common to the main content into the relevant content list. Hereinafter, a specific example of display control by the display control unit 236 is described with reference to FIGS. 15 and 16.

Referring to FIG. 15, when the content information of the contents L to R is acquired as the relevant content information of the main content by the content information acquisition unit 232, the display control unit 236 determines the attribute classification having the attribute value common to the main content with respect to each of the contents L to R. For example, in the example shown in FIG. 15, the content L is common to the main content in the attribute value of the location, the content M is common to the main content in the attribute value of the cast, the content N is common to the main content in the attribute values of the location, the theme, and the broadcast time.

In this case, with respect to each of the contents L to R, the display control unit 236 incorporates the display information related to the attribute classification with the highest selection tendency among the attribute classifications whose attribute values are common to the main content into the relevant content list as the display information of the contents L to R.

Figure 16:
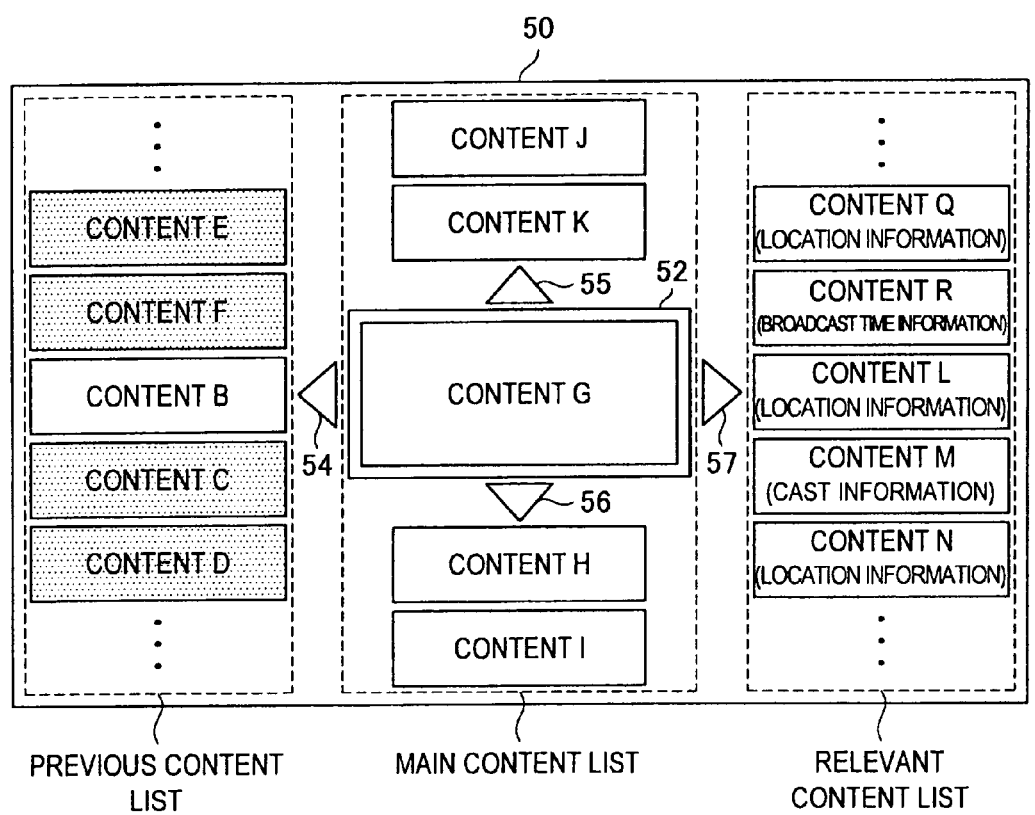
FIG. 16 is an explanatory view showing a specific example of a content list screen displayed according to the first embodiment.

Specifically, as for the content L, the attribute classification whose attribute value is common to the main content is only the location. Therefore, as shown in FIG. 16, the display control unit 236 incorporates the location information (a location name included in the content information, a location image referred to by a location image URI etc.) related to the content L into the relevant content list.

Further, as for the content M, the attribute classification whose attribute value is common to the main content is only the cast. Therefore, as shown in FIG. 16, the display control unit 236 incorporates the cast information (a cast name included in the content information, a cast image referred to by a cast image URI etc.) related to the content M into the relevant content list.

Likewise, as for the content R, the attribute classification whose attribute value is common to the main content is only the broadcast time. Therefore, as shown in FIG. 16, the display control unit 236 incorporates the broadcast time information (a text or an image indicating the broadcast time included in the content information etc.) related to the content R into the relevant content list.

On the other hand, as for the content N, the selection tendency in relation to the location is the highest among a plurality of attribute classifications (the location, the theme and the broadcast time) whose attribute values are common to the main content. Therefore, as shown in FIG. 16, the display control unit 236 incorporates the location information of the content N into the relevant content list.

Likewise, as for the content Q, the selection tendency in relation to the location is the highest among a plurality of attribute classifications (the location and the broadcast time) whose attribute values are common to the main content. Therefore, as shown in FIG. 16, the display control unit 236 incorporates the location information of the content Q into the relevant content list.

Note that the case where only one display information for each content is incorporated into the relevant content list is described above, the present invention is not limited thereto. For example, in the case where a plurality of display information for each content can be incorporated into the relevant content list, the display control unit 236 may incorporate a plurality of display information into the relevant content list in descending order of the selection tendency. Further, the display control unit 236 may incorporate display information into the relevant content list in preference to the display information which has been displayed in the previous relevant content list for a certain content. For example, when the location information of the content N has been displayed in the previous relevant content list, the display control unit 236 may incorporate theme information with the next highest selection tendency into the relevant content list. This prevents the case where the same display information of the same content is displayed repeatedly on the content list screen.

(2-3. Operation According to First Embodiment)

The configuration of the client terminal 20 according to the first embodiment is described above. Next, the operation of the client terminal 20 and the ECG server 10 according to the first embodiment is described hereinafter with reference to FIG. 17.

Figure 17:
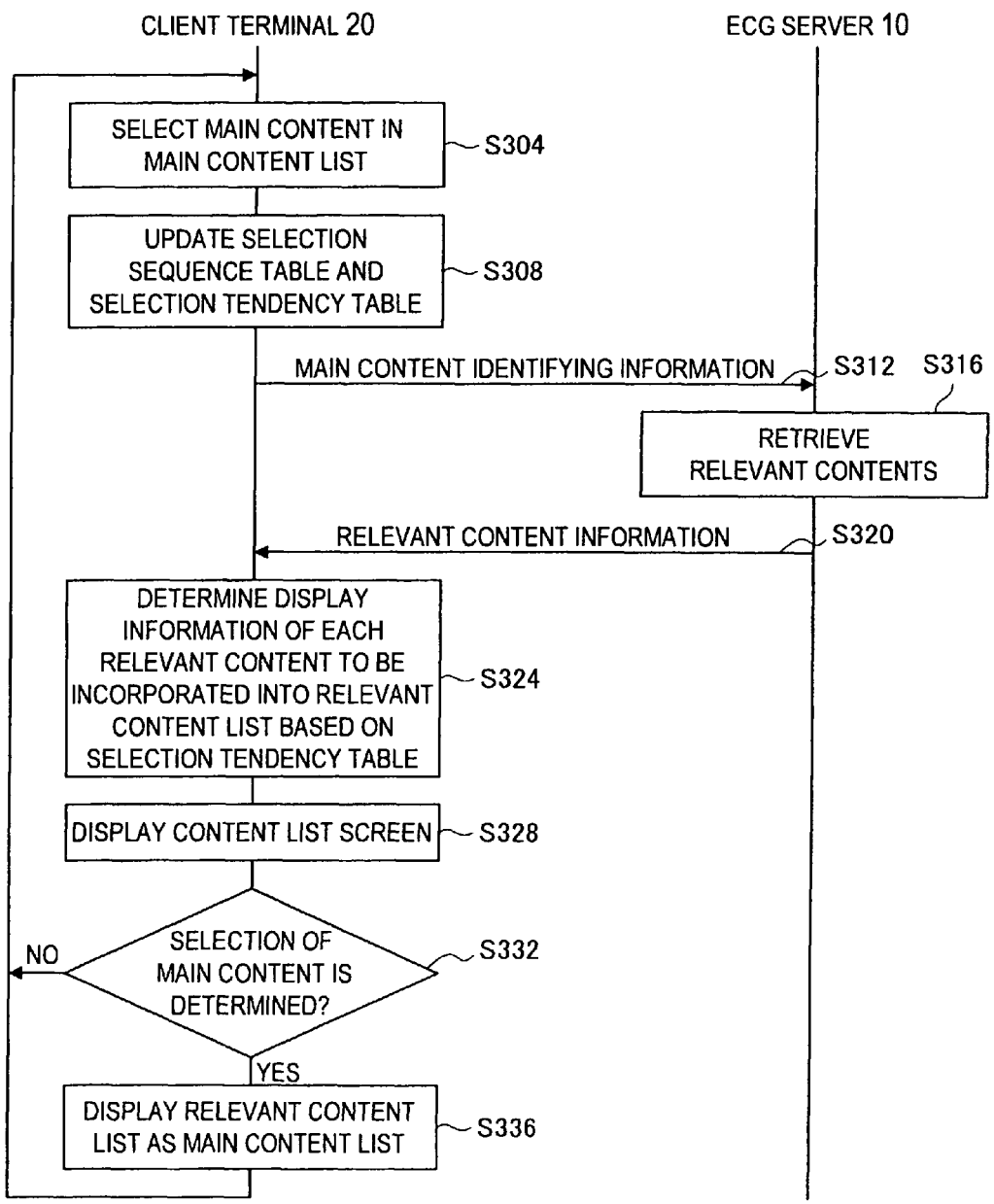
FIG. 17 is a sequence chart showing an operation of a client terminal and an ECG server according to the first embodiment.

FIG. 17 is a sequence chart showing the operation of the client terminal 20 and the ECG server 10 according to the first embodiment. Referring to FIG. 17, when a selection operation of the main content in the main content list by a user is detected by the operation detection unit 228 (S304), the attribute classification extraction unit 240 updates the selection sequence table, and the selection tendency calculation unit 248 updates the selection tendency table (S308).

Further, the content information acquisition unit 232 transmits information identifying the main content selected by the user in S304 to the ECG server 10 (S312). Then, the information retrieval unit 128 of the ECG server 10 retrieves relevant contents to the main content (S316) and transmits the relevant content information to the client terminal 20 (S320).

Then, the display control unit 236 of the client terminal 20 refers to the selection tendency table and determines the display information of the respective relevant contents to be incorporated into the relevant content list (S324). Specifically, the display control unit 236 incorporates the display information related to the attribute classification with the highest selection tendency among the attribute classifications whose attribute values are common to the main content with respect to each of the relevant contents into the relevant content list. The display unit 224 then displays the content list screen created by the display control unit 236 (S328).

After that, when selection of the main content is determined by the user controlling the right key 57 on the content list screen, i.e., when content selection from the relevant content list is requested (S332), the display control unit 236 creates the next content list screen in which the current relevant content list is contained as the main content list (S336). Then, the process from S304 is repeated.

As described above, according to the first embodiment, it is possible to preferentially incorporate the display information related to the attribute classification on which a user tends to focus attention at the time of content selection into the relevant content list. It is thereby possible to improve the appealing effect to a user by the display information of the respective relevant contents.

(2-4. Alternative Examples)

Although the first embodiment of the present invention is described above, the configuration of the first embodiment may be altered in various ways. Alternative examples of the first embodiment are described hereinafter.

Relating to the Selection Tendency Calculation Method

As described above, there is a possibility that to which attribute information a user selects a content in relation can change with time. Thus, the selection tendency calculation unit 248 may calculate a score for each attribute classification by assigning heavier weights to the selection tendency in the more recent step as shown in the following expression:

Score=(selection tendency in latest 20 steps)×1+(selection tendency in 40 to 20 steps before)×0.5

According to the above expression, the score of the cast is calculated as follows in the example shown in FIG. 13;

Score of Cast=((4+5)/20)×1+((2+1)/20)×0.5 =45×1+ 15×0.5=52.5

In this alternative example, the above-described scores of the respective attribute classifications are stored as the selection tendency table in the table storage unit 244. Therefore, the display control unit 236 can perform display control on the content list screen by referring to the above-described scores on which the selection tendency in the recent steps is reflected more strongly than the selection tendency in the old steps.

Further, although the case where the time axis is divided using the number of steps is described above, the way of dividing the time axis is not limited thereto. For example, the time axis may be divided using the log acquisition date and time, such as ∘ hours to ∘ hours before or ∘ days to ∘ days before.

Furthermore, although the case of calculating the selection tendency or the score by using a plurality of log information is described above, the log information to be use may be the latest log information only. For example, the display control unit 236 may preferentially display the display information related to the attribute classification whose attribute value is common between the latest main content and the immediately previous main content on the content list screen. Because the selection tendency table is not used in this case, the selection tendency calculation unit 248 may be not necessarily placed in the client terminal 20.

Relating to Implementation of Functional Blocks in the Information Processing System 1

Although the case where the client terminal 20 includes the attribute classification extraction unit 240, the table storage unit 244, the selection tendency calculation unit 248 and so on and controls the display information of each content displayed on the content list screen is described above, this embodiment is not limited thereto. As an alternative example, at least any of the functions of the attribute classification extraction unit 240, the table storage unit 244, the selection tendency calculation unit 248 and so on may be implemented in the ECG server 10.

Further, although the case where the ECG server 10 includes the content information storage unit 120 and the information retrieval unit 128 and retrieves the relevant contents of the content selected by a user is described above, this embodiment is not limited thereto. As an alternative example, the functions of the content information storage unit 120 and the information retrieval unit 128 may be implemented in the client terminal 20, so that the process described in the first embodiment can be completed within the client terminal 20.

Alternatively, the functions of the content information storage unit 120 and the information retrieval unit 128 may be implemented in both of the ECG server 10 and the client terminal 20. In this case, the display control unit 236 may create the content list screen by using both of the content information provided from the ECG server 10 and the content information retrieved in the client terminal 20.

It should be noted that, in the second embodiment and the third embodiment described hereinbelow as well, the respective functional blocks may be implanted in either one of the client terminal 20 or the ECG server 10 or may be implanted in both of the client terminal 20 and the ECG server 10.

<3. Second Embodiment>

According to the second embodiment of the present invention, it is possible to control for which relevant contents the display information is to be incorporated into the relevant content list in the content list screen according to the attribute classification on which a user tends to focus attention at the time of content selection. The second embodiment of the present invention is described hereinafter in detail.

(3-1. Configuration of Client Terminal According to Second Embodiment)

Figure 18:
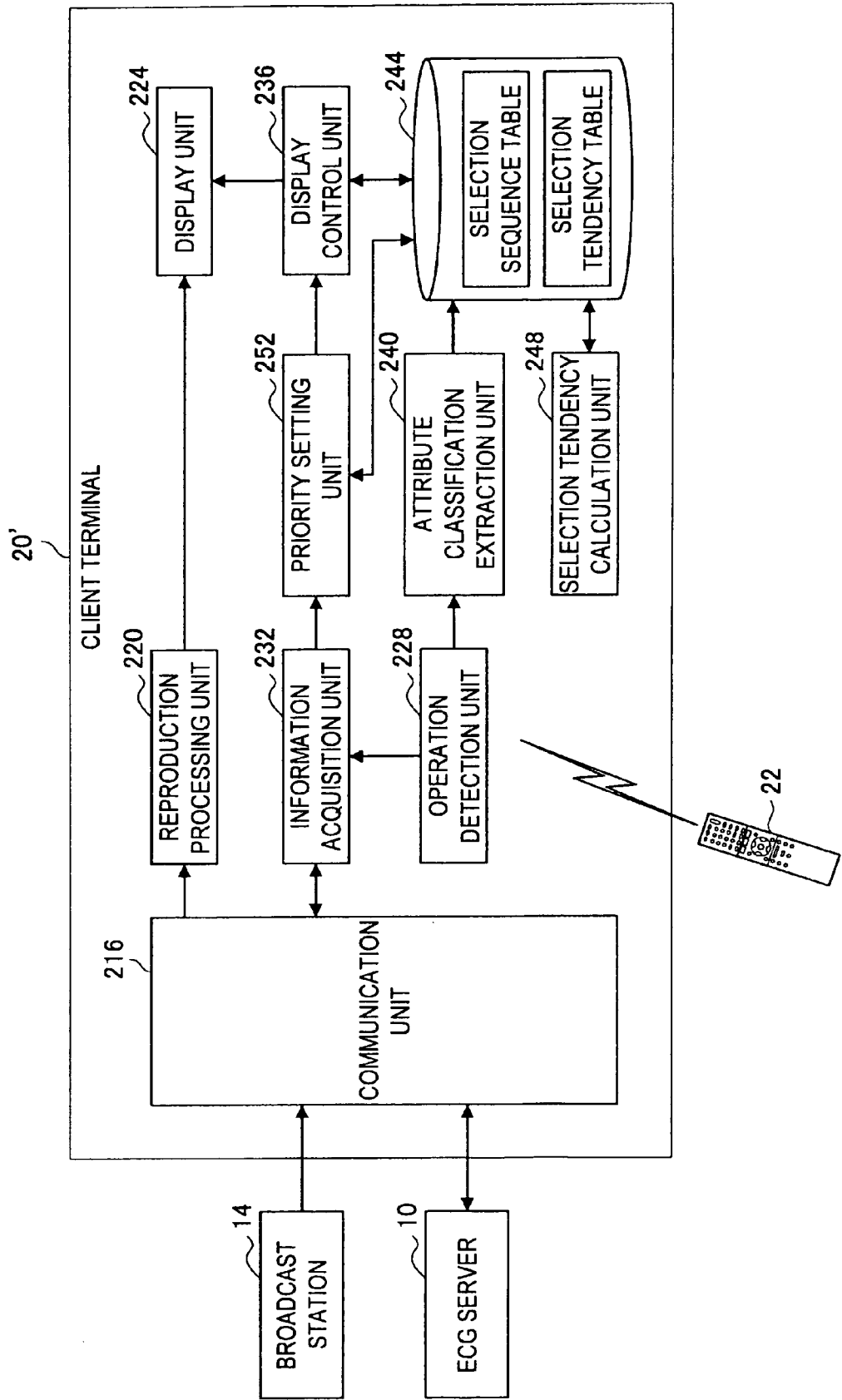
FIG. 18 is a functional block diagram showing a configuration of a client terminal according to the second embodiment.

FIG. 18 is a functional block diagram showing a configuration of a client terminal 20' according to the second embodiment. Referring to FIG. 18, the client terminal 20' according to the second embodiment includes a communication unit 216, a reproduction processing unit 220, a display unit 224, an operation detection unit 228, a content information acquisition unit 232, a display control unit 236, an attribute classification extraction unit 240, a table storage unit 244, a selection tendency calculation unit 248, and a priority setting unit 252.

The communication unit 216, the reproduction processing unit 220, the display unit 224, the operation detection unit 228, the content information acquisition unit 232, the attribute classification extraction unit 240, the table storage unit 244 and the selection tendency calculation unit 248 may be substantially the same as those of the first embodiment, and detailed explanation thereof is omitted.

When relevant content information of a plurality of relevant contents is acquired by the content information acquisition unit 232, the priority setting unit 252 sets priorities to the respective relevant contents. Then, the display control unit 236 controls the display information to be incorporated into the relevant content list based on the priorities set by the priority setting unit 252. Hereinafter, the setting of priorities and a specific example of display control are described with reference to FIGS. 19 and 20.

Referring to FIG. 19, when the content information of the contents L, B, and N to R is acquired by the content information acquisition unit 232 as the relevant content information of the main content, the priority setting unit 252 determines the attribute classification having the attribute value common to the main content with respect to each of the contents L, B, and N to R. For example, in the example shown in FIG. 19, the content L is common to the main content in the attribute value of the location, the content B is common to the main content in the attribute value of the cast, the content N is common to the main content in the attribute values of the location and the theme.

Then, the priority setting unit 252 sets the priority for each of the contents L, B, and N to R by adding up the selection tendency (the number in parentheses, which is described earlier in the first embodiment) of the attribute classification whose attribute value is common to the main content. For example, the content L is common to the main content in the attribute value of the location, and the selection tendency in relation to the location is "15%". Therefore, the priority setting unit 252 sets the priority "15" to the content L.

Further, the content N is common to the main content in the attribute values of the location and the theme, and the selection tendency in relation to the location is "15%", and the selection tendency in relation to the theme is "10%". Therefore, the priority setting unit 252 sets the priority "25" to the content L.

On the other hand, the content B is common to the main content in the attribute value of the cast, and the selection tendency in relation to the cast is "45%". However, when the content B is the immediately previous main content, the priority setting unit 252 reduces the priority of the content B and sets the priority "5" to the content B, for example. This prevents the case where the immediately previous main content is displayed in the relevant content list.

Note that the target for which the priority setting unit 252 reduces the priority is not limited to the immediately previous main content. For example, the priority setting unit 252 may reduce the priorities of the latest predetermined number of main contents, reduce the priorities of the contents included in the immediately previous main content list, or reduce the priorities of the contents included in the latest predetermined number of main content lists. In this configuration, it is possible to prevent the case where the display information of the same content is displayed repeatedly on the content list screen.

After the priorities of the contents L, B, and N to R are set as shown in FIG. 19 by the priority setting unit 252, the display control unit 236 controls for which relevant contents the display information is to be incorporated into the relevant content list based on the priorities of the respective contents.

Figure 20:
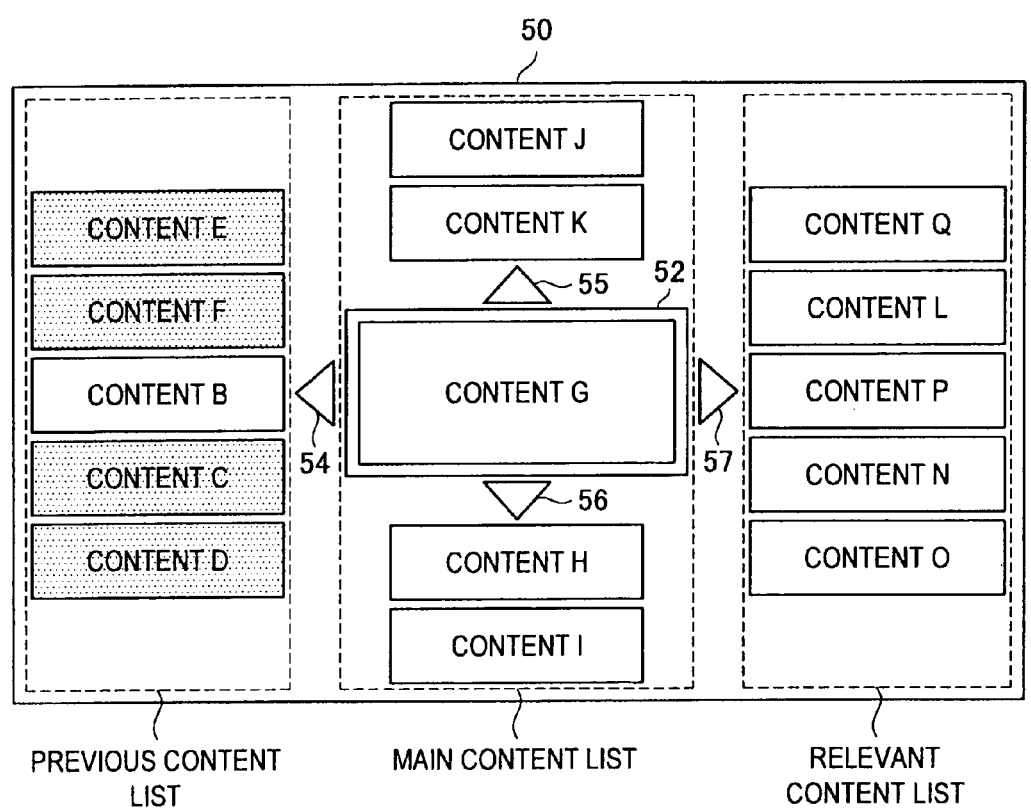
FIG. 20 is an explanatory view showing a specific example of a content list screen displayed according to the second embodiment.

For example, when the upper limit of the display information which can be displayed in the relevant content list is 5, the display control unit 236 incorporates the display information of the five contents with the high priorities into the relevant content list as shown in FIG. 20. Further, the display control unit 236 may control the positions of the respective display information according to their priorities. For example, the display control unit 236 may place the display information of the content P with the highest priority at the center of the relevant content list.

Further, for the contents with the same priority, such as the contents N and O, preference may be given to the content N with the more common attribute classifications or to the content O with the common attribute classification "period" having the higher selection tendency.

(3-2. Operation According to Second Embodiment)

The configuration of the client terminal 20' according to the second embodiment is described above. Next, the operation of the client terminal 20' and the ECG server 10 according to the second embodiment is described hereinafter with reference to FIG. 21.

Figure 21:
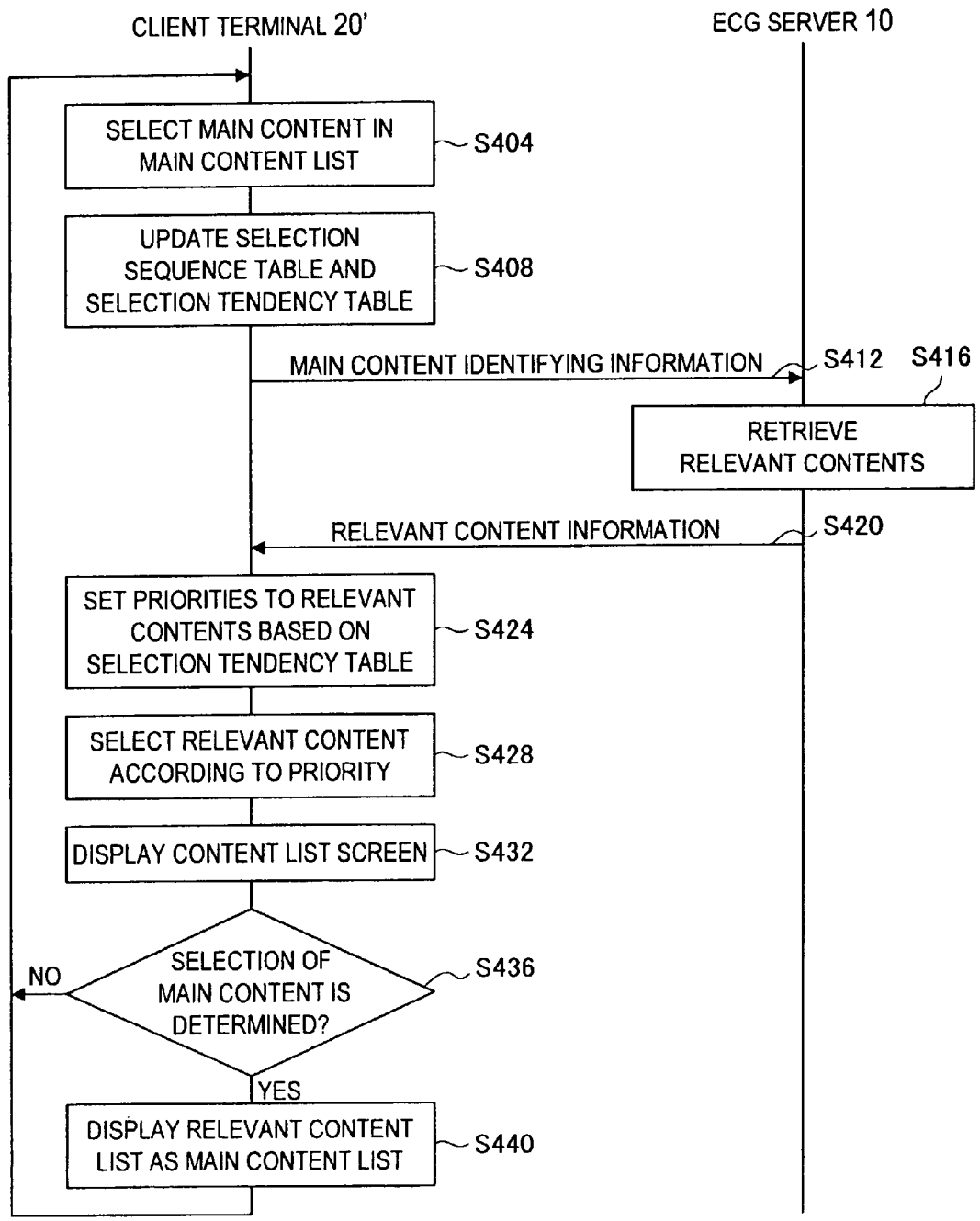
FIG. 21 is a sequence chart showing an operation of a client terminal and an ECG server according to the second embodiment.

FIG. 21 is a sequence chart showing the operation of the client terminal 20' and the ECG server 10 according to the second embodiment. Referring to FIG. 21, when a selection operation of the main content in the main content list by a user is detected by the operation detection unit 228 (S404), the attribute classification extraction unit 240 updates the selection sequence table, and the selection tendency calculation unit 248 updates the selection tendency table (S408).

Further, the content information acquisition unit 232 transmits information identifying the main content selected by the user in S404 to the ECG server 10 (S412). Then, the information retrieval unit 128 of the ECG server 10 retrieves relevant contents to the main content (S416) and transmits the relevant content information to the client terminal 20' (S420).

Then, the priority setting unit 252 refers to the selection tendency table and sets the priorities to the respective relevant contents (S424). Further, the display control unit 236 selects the display information of the relevant contents to be incorporated into the relevant content list according to the priorities set by the priority setting unit 252, and creates the content list screen (S428). The display unit 224 then displays the content list screen created by the display control unit 236 (S432).

After that, when selection of the main content is determined by the user controlling the right key 57 on the content list screen, i.e., when content selection from the relevant content list is requested (S436), the display control unit 236 creates the next content list screen in which the current relevant content list is contained as the main content list (S440). Then, the process from S404 is repeated.

As described above, according to the second embodiment, it is possible to control for which relevant contents the display information is to be incorporated into the relevant content list according to the attribute classification on which a user tends to focus attention at the time of content selection.

<4. Third Embodiment>

The third embodiment of the present invention is combination of the first embodiment and the second embodiment of the present invention. Specifically, according to the third embodiment of the present invention, it is possible to control for which relevant contents the display information is to be incorporated into the relevant content list in the content list screen according to the attribute classification on which a user tends to focus attention at the time of content selection. Further, according to the third embodiment of the present invention, it is also possible to control the details of the display information of the relevant contents to be incorporated into the relevant content list. The third embodiment of the present invention is described hereinafter.

Figure 22:
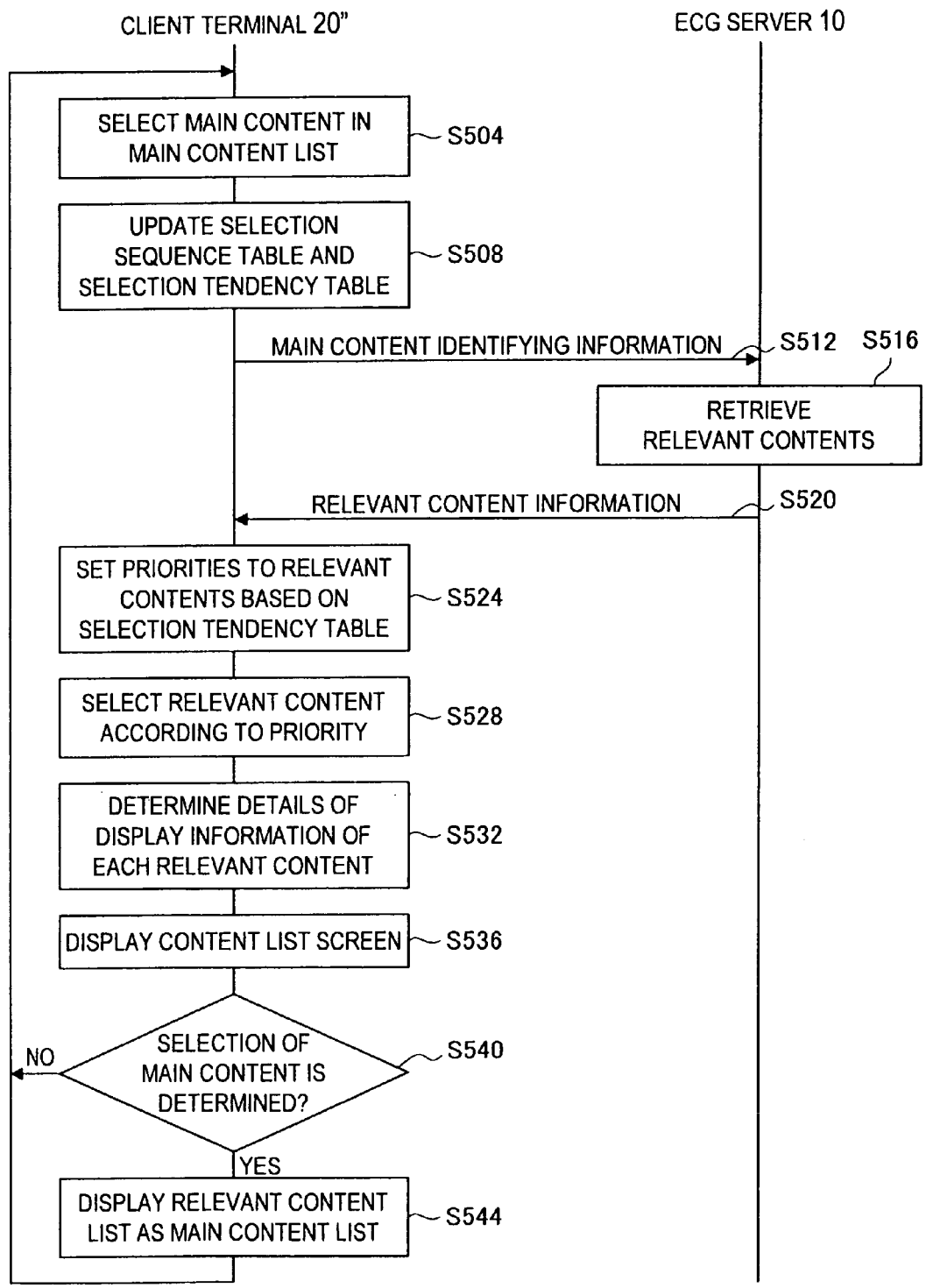
FIG. 22 is a sequence chart showing an operation of a client terminal and an ECG server according to the third embodiment.

FIG. 22 is a sequence chart showing the operation of a client terminal 20'' and the ECG server 10 according to the third embodiment. Note that the client terminal 20'' has the same functional blocks as the client terminal 20' according to the second embodiment. Referring to FIG. 22, when a selection operation of the main content in the main content list by a user is detected by the operation detection unit 228 (S504), the attribute classification extraction unit 240 updates the selection sequence table, and the selection tendency calculation unit 248 updates the selection tendency table (S508).

Further, the content information acquisition unit 232 transmits information identifying the main content selected by the user in S504 to the ECG server 10 (S512). Then, the information retrieval unit 128 of the ECG server 10 retrieves relevant contents to the main content (S516) and transmits the relevant content information to the client terminal 20'' (S520).

Then, the priority setting unit 252 refers to the selection tendency table and sets the priorities to the respective relevant contents (S524). Further, the display control unit 236 selects the relevant contents to be incorporated into the relevant content list according to the priorities set by the priority setting unit 252 (S528).

Furthermore, the display control unit 236 refers to the selection tendency table and determines the details of the display information of the respective relevant contents to be incorporated into the relevant content list (S532).

Specifically, the display control unit 236 incorporates the display information related to the attribute classification with the highest selection tendency among the attribute classifications whose attribute values are common to the main content with respect to each of the relevant contents into the relevant content list. The display control unit 236 then creates the content list screen that contains the above-described relevant content list, and the display unit 224 displays the content list screen (S536).

After that, when selection of the main content is determined by the user controlling the right key 57 on the content list screen, i.e., when content selection from the relevant content list is requested (S540), the display control unit 236 creates the next content list screen in which the current relevant content list is contained as the main content list (S544). Then, the process from S504 is repeated.

Figure 23:
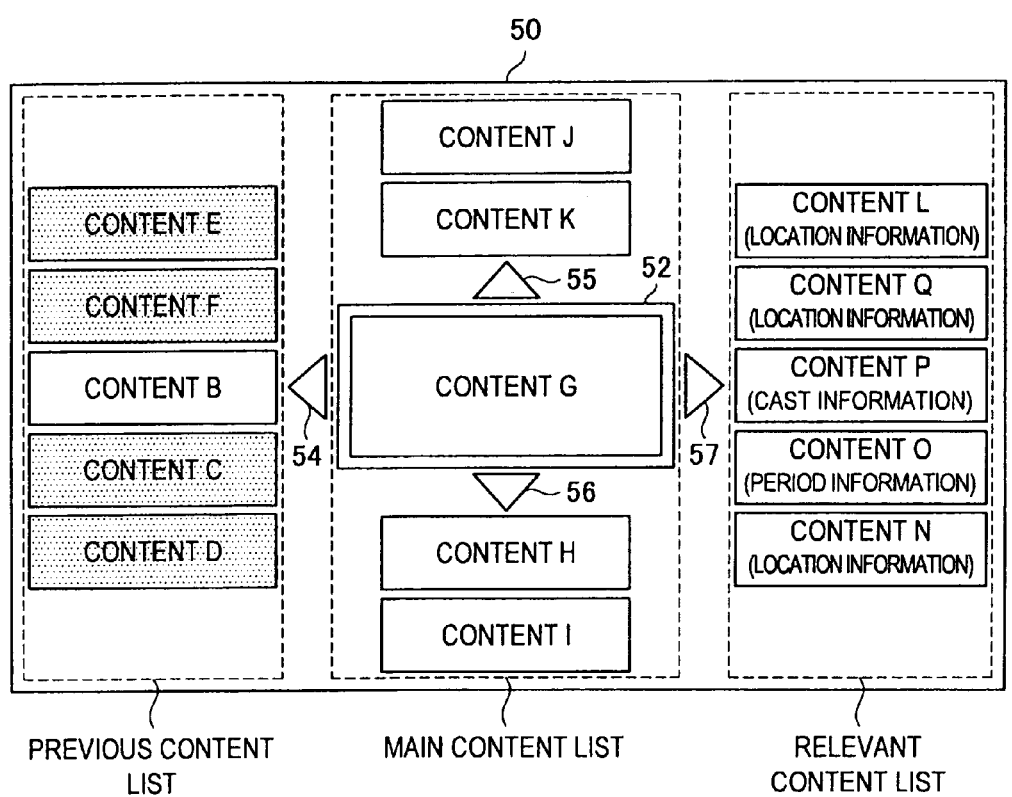
FIG. 23 is an explanatory view showing a specific example of a content list screen displayed according to the third embodiment.

According to the third embodiment of the present invention described above, when the relevant content information shown in FIG. 19 is acquired, the display information of the contents P, O, N, Q and L may be incorporated into the relevant content list in descending order of the priority as shown in FIG. 23. Further, the details of the display information of the respective relevant contents can be controlled according to the attribute classification whose attribute value is common to the main content. Specifically, the cast information of the content P can be displayed as the display information of the content P, and the location information of each of the contents O, N, Q and L can be displayed as the display information of each of the contents P, N, Q and L.

<5. Alternative Examples of Content List Screen>

Although the case where the content list screen 50 is composed of three hierarchical levels of the previous content list, the main content list and the relevant content list is described above, the structure of the content list screen 50 is not limited thereto. Alternative examples of the content list screen 50 are described hereinbelow.

(5-1. First Alternative Example)

Figure 24:
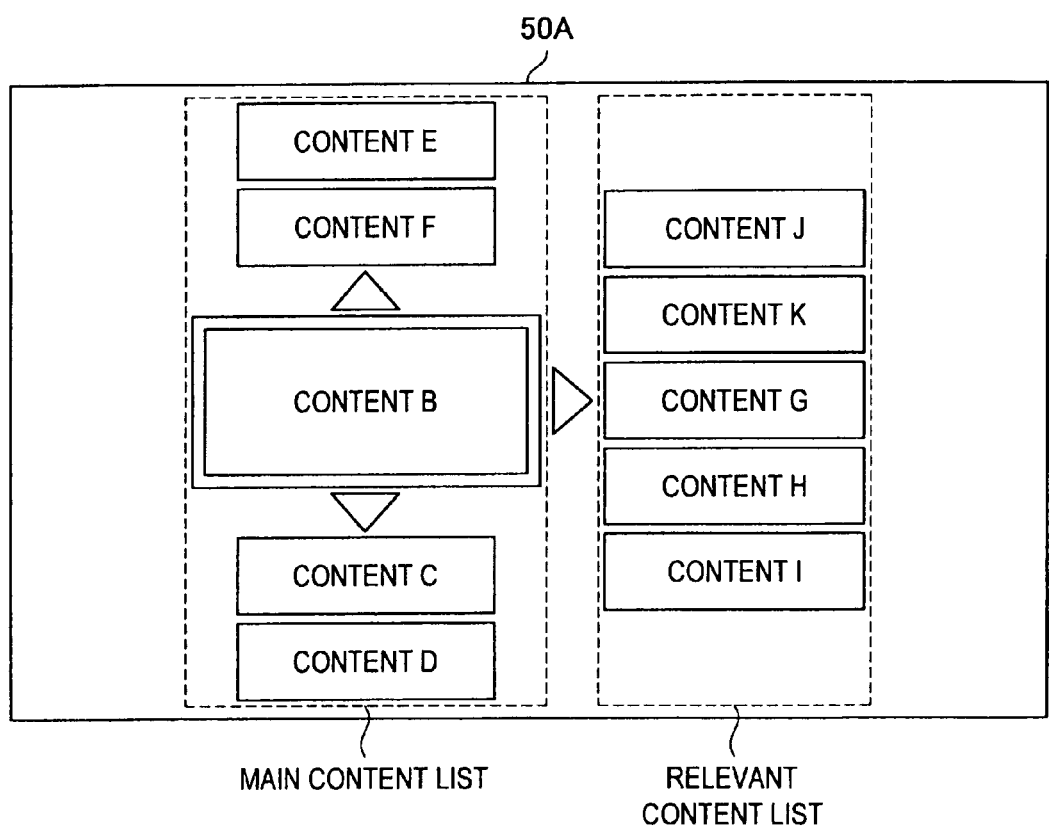
FIG. 24 is an explanatory view showing a content list screen according to a first alternative example.

FIG. 24 is an explanatory view showing a content list screen 50A according to a first alternative example. Referring to FIG. 24, the content list screen 50A according to the first alternative example is composed of two hierarchical levels of the main content list and the relevant content list, and it does not include the previous content list. On the content list screen 50A according to the first alternative example, transition in the hierarchical level (list) is made by cursor movement in the crosswise direction of the screen, and selection of the content in the same list is made by cursor movement in the lengthwise direction.

(5-2. Second Alternative Example)

Figure 25:
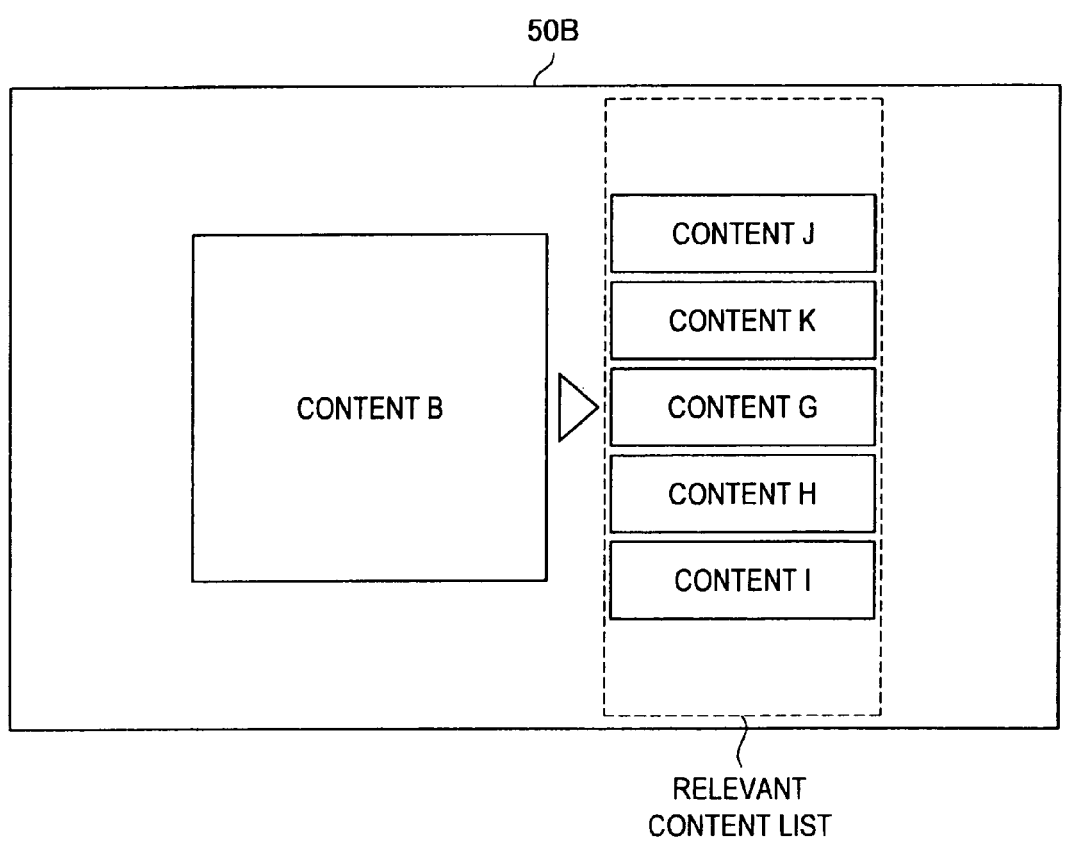
FIG. 25 is an explanatory view showing a content list screen according to a second alternative example.

FIG. 25 is an explanatory view showing a content list screen 50B according to a second alternative example. Referring to FIG. 25, the content list screen 50B according to the second alternative example is composed of two hierarchical levels of the display information of one content and the relevant content list. On the content list screen 50B according to the second alternative example, transition in the hierarchical level (list) is made by cursor movement in the crosswise direction of the screen, and selection of the content in the relevant content list is made by cursor movement in the lengthwise direction. Further, when one content is selected from the relevant content list on the content list screen 50B, the content list screen 50B is switched to a content list screen composed of the selected content and the relevant content list of the selected content.

(5-3. Third Alternative Example)

FIG. 26 is an explanatory view showing a content list screen 50C according to a third alternative example. Referring to FIG. 26, the content list screen 50C according to the third alternative example is composed of three hierarchical levels of the previous content list, the main content list and the relevant content list. On the content list screen 50C according to the third alternative example, transition in the hierarchical level (list) is made by cursor movement in the lengthwise direction of the screen, and selection of the content in the same list is made by cursor movement in the crosswise direction.

<6. Supplementary Explanation>

Although preferred embodiments of the present invention are described in detail above with reference to the appended drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

For example, although the cast, the period, the location, the theme and the broadcast time are used as examples of the attribute classification which is extracted by the attribute classification extraction unit 240 in the above description, the attribute classification is not limited to those examples. As other examples of the attribute classification, various attributes such as a staff, music such as a theme song or a featured song, a genre, a channel and a produced year may be used.

Further, it is not always necessary to perform the steps in the processing of the information processing system 1 of the specification in chronological order according to the sequence shown in sequence charts. For example, the steps in the processing of the information processing system 1 may be processed in a difference sequence from the sequence shown in sequence charts or may be processed in parallel.

Furthermore, it is possible to create a computer program that causes hardware such as the CPU 201, the ROM 202 and the RAM 203 incorporated in the client terminal 20 and the ECG server 10 to perform the equal functions to the elements of the client terminal 20 and the ECG server 10 described above. Further, a storage medium that stores such a computer program may be provided.

What is claimed is:

1. A display control system comprising:
a server device that stores content information and provides the content information; and
a display control device including a display control unit that, based on content information of a plurality of contents provided from the server device, creates a display screen containing display information of at least any of the plurality of contents and, when display information of one content of the plurality of contents is selected, creates a next display screen containing display information of at least any of a plurality of contents relevant to the one content,
wherein the display information contained in the next display screen is display information of contents according to (i) the one content which was last selected and (ii) a selection sequence of a plurality of display information having been selected before among the plurality of contents relevant to the one content, such that if the one content is selected after a first selection sequence of display information has been selected the next display screen displays first display information and if the same one content is selected after a second selection sequence of display information has been selected which is different from the first sequence selection the next display screen displays second display information which is different from the first display information.

2. The display control system according to claim 1, wherein
the display control device further includes an extraction unit that extracts an attribute classification of an attribute value common between two contents corresponding to two successive display information in the selection sequence, and
display information of a content having an attribute value common to the attribute value of the attribute classification of the one content extracted by the extraction unit among the plurality of contents relevant to the one content is preferentially incorporated into the next display screen.

3. The display control system according to claim 2, wherein
the display control device further includes a priority setting unit that sets a priority to each of display information of the plurality of contents relevant to the one content based on whether each of the plurality of contents relevant to the one content has an attribute value common to the attribute value of the attribute classification of the one content extracted by the extraction unit, and
the display control unit creates the next display screen according to the priority set by the priority setting unit.

4. The display control system according to claim 3, wherein
the priority setting unit sets a higher priority to display information of a content if the said content's attribute classification whose attribute value is common to the one content has a higher selections tendency.

5. The display control system according to claim 3, wherein
the priority setting unit reduces a priority of display information having been contained in the display screen before among the display information of the plurality of contents relevant to the one content.

6. The display control system according to claim 5, wherein the priority setting unit reduces priorities of the plurality of display information having been selected before among the display information of the plurality of contents relevant to the one content.

7. The display control system according to claim 2, wherein the attribute classification extraction unit stores a log information that includes the extracted attribute classification and attribute value in a selection sequence table, and wherein display control device further includes a selection tendency calculation unit that calculates a tendency that a user selects a relevant content to the one content based on the selection sequence table, wherein the display control unit controls the display information to be incorporated into the next display screen by referring to the said selection tendency.

8. A display control device comprising:

a display control unit that, when display information of one content among a plurality of contents is selected on a display screen, creates a next display screen containing display information of at least any of a plurality of contents relevant to the one content, wherein the display information contained in the next display screen is display information of contents according to (i) the one content which was last selected and (ii) a selection sequence of a plurality of display information having been selected before among the plurality of contents relevant to the one content, such that if the one content is selected after a first selection sequence of display information has been selected the next display screen displays first display information and if the same one content is selected after a second selection sequence of display information has been selected which is different from the first sequence selection the next display screen displays second display information which is different from the first display information.

9. A display control method comprising the steps of:

creating a display screen containing at least any of a plurality of contents; and creating, when one content is selected on the display screen, a next display screen containing display information of at least any of a plurality of contents relevant to the one content, wherein the display information contained in the next display screen is display information of contents according to i) the one content which was last selected and (ii) a selection sequence of a plurality of display information having been selected before among the plurality of contents relevant to the one content, such that if the one content is selected after a first selection sequence of display information has been selected the next display screen displays first display information and if the same one content is selected after a second selection sequence of display information has been selected which is different from the first sequence selection the next display screen displays second display information which is different from the first display information.

10. The display control method according to claim 9, further comprising the steps of extracting an attribute classification of an attribute value common between two contents corresponding to two successive display information in the selection sequence, storing a log information that includes the extracted attribute classification and attribute value, and calculating a selection tendency that a user selects a relevant content to the one content based on the stored log information.

* * * * *